US007796155B1

(12) United States Patent  (10) Patent No.: US 7,796,155 B1
Neely, III et al.  (45) Date of Patent: Sep. 14, 2010

(54) METHOD AND APPARATUS FOR REAL-TIME GROUP INTERACTIVE AUGMENTED-REALITY AREA MONITORING, SUITABLE FOR ENHANCING THE ENJOYMENT OF ENTERTAINMENT EVENTS

(75) Inventors: Howard Neely, III, Manhattan Beach, CA (US); Ronald T. Azuma, Santa Monica, CA (US); Jerry Isdale, Thousand Oaks, CA (US); Mike Daily, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 1663 days.

(21) Appl. No.: 11/019,991

(22) Filed: Dec. 20, 2004

Related U.S. Application Data

(60) Provisional application No. 60/531,456, filed on Dec. 19, 2003.

(51) Int. Cl.
  *G06F 17/00* (2006.01)
  *G06T 1/00* (2006.01)
  *G06T 15/00* (2006.01)
  *G06T 17/00* (2006.01)
(52) U.S. Cl. .................. 348/157; 348/143; 345/418; 345/419; 345/420; 345/421; 345/422
(58) Field of Classification Search .............. 348/143, 348/157; 345/418–422
  See application file for complete search history.

(56) References Cited

U.S. PATENT DOCUMENTS

| | | | |
|---|---|---|---|
| 4,970,666 A | | 11/1990 | Welsh et al. |
| 5,397,133 A | * | 3/1995 | Penzias ........................ 463/22 |
| 5,543,856 A | | 8/1996 | Rosser et al. |
| 5,659,691 A | * | 8/1997 | Durward et al. ............. 715/757 |
| 5,802,284 A | | 9/1998 | Karlton et al. |
| 5,912,700 A | * | 6/1999 | Honey et al. ................. 348/157 |
| 5,923,365 A | * | 7/1999 | Tamir et al. ................. 348/169 |
| 5,953,076 A | | 9/1999 | Astle et al. |
| 6,154,250 A | | 11/2000 | Honey et al. |

(Continued)

OTHER PUBLICATIONS

Berman, D.K., "Local Bells Look to Fiber to Stem Some Losses," The Wall Street Journal, Jun. 19, 2003.

(Continued)

*Primary Examiner*—Marsha D Banks Harold
*Assistant Examiner*—Chikaodili E Anyikire
(74) *Attorney, Agent, or Firm*—Tope-McKay & Assoc.

(57) ABSTRACT

A real-time, group interactive, augmented-reality system for monitoring an area, suitable for enhancing the enjoyment of entertainment events, is presented. The system comprises a sensor data acquisition system for receiving sensor data, in real-time, from a plurality of data acquisition sensors disposed about an area to be monitored, and a plurality of display centers communicatively coupled with the data acquisition system for receiving sensor data therefrom. A display center includes an user input, a data acquisition sensor selector, an interaction interface for communicating in real-time with users of other display centers, an interface for connecting a display device, and a local display device augmenting system, which are configured to allow a user to interactively augment in real-time his/her local display of events with user-inputted doodles, user requested information and statistics, and user selected viewing angles. The system allows users to interactively share the locally augmented-reality display with users of other display centers.

14 Claims, 16 Drawing Sheets

U.S. PATENT DOCUMENTS

| | | | |
|---|---|---|---|
| 6,266,100 | B1 | 7/2001 | Gloudemans et al. |
| 6,317,127 | B1 | 11/2001 | Daily et al. |
| 6,380,933 | B1 | 4/2002 | Sharir et al. |
| 6,449,010 | B1 * | 9/2002 | Tucker ..................... 348/157 |
| 2002/0176000 | A1 * | 11/2002 | Katayama .................. 348/157 |
| 2002/0188943 | A1 * | 12/2002 | Freeman et al. .............. 725/38 |
| 2003/0012410 | A1 * | 1/2003 | Navab et al. ................ 382/103 |

OTHER PUBLICATIONS

Dockstader, S. L., A.M. Tekalp, "Tracking Multiple Objects in the Presence of Articulated and Occluded Motion," Proceedings of the Workshop on Human Motion, Austin, TX Dec. 7-8, 2000, pp. 88-95.

Dockstader, S.L., A.M. Tekalp, "Multiple camera tracking of interacting and occluded human motion," Proceedings of the IEEE, Oct. 2001, pp. 1441-1455.

Web site, "EA Sports NBA Live 2003," Electronic Arts Inc., http://www.easports.com/platforms/games/nbalive2003/home.jsp.

Gavrila, D.M., L.S. Davis, "3D model based tracking of humans in action: a multi-view approach," Proceedings CVPR '96: 1996 IEEE Computer Society Conference on Computer Vision and Pattern Recognition, Jun. 18-20, 1996, San Francisco, 1996.

Li, Z., H. Wang, "Real-Time 3D Motion Tracking with Known Geometric Models," Real Time Imaging 5, Academic Press 1999, pp. 167-187.

Web page, "Nokia N-Gage," Nokia, http://www.n-gage.com/n-gage/home.html.

Rehg, J.M., T. Kanade, "Model-based tracking of self-occluding articulated objects," Proceedings, Fifth International Conference on Computer Vision, IEEE Computer Society Press, Jun. 20-23, 1995, Cambridge, MA, 1995, pp. 612-617.

Mills, D.L., Network Time Protocol (Version 3), Network Working Group, Internet Engineering Task Group, Mar. 1992 (http://www.ntp.org).

Press release, "Yao Ming Basketball by Sorrent to be Distributed Exclusively via QUALCOMM's BREW Solution," QUALCOMM Incorporated, Apr. 29, 2003.

Press Release, "Sony Ericsson unveils the T606, a CDMA phone with state-of-the-art mobile entertainment and imaging features," Sony Ericsson, Mar. 4, 2003.

Web page, "Sony Ericsson-Specifications for the T310," Sony Ericsson, Jun. 20, 2003.

Yang, S-j, "SKT Launches New Technology in Incheon," The Korea Herald, Jan. 28, 2002.

American National Standard for Information Technology—Fibre Channel—Physical and Signaling Interface (FC-PH), American National Standards Institute, Inc., X3.230, Nov. 14, 1994.

Connexion by Boeing, "Frequently Asked Questions," 2002, http://active.boeing.com/connexion/Bocy.cfm?left=2A.

Cavallaro, R., "The FoxTrak Hockey Puck Tracking System," IEEE Computer Graphics and Applications, Mar.-Apr. 1997, pp. 6-12.

SEC Form 10-K for Clear Channel Communications, Inc., Dec. 31, 2001.

Glaskowsky, P.N., "Microsoft Weighs in with X-Box," Microprocessor Report, Cahners Publications, Apr. 2000.

Gueziec, A., "Tracking Pitches for Broadcast Television," Computer, Mar. 2002, pp. 38-43.

Heinzl, M., "Telecoms Hunt for Broadband 'Killer Apps' to use Nearly empty Data Delivery Pipes," The Wall Street Journal, Jun. 14, 2001.

Hindus, L.A, "CMOS: The Image of the Future," Advanced Imagining Magazine, May 2001, pp. 33-35.

Data sheet, "Kodak Digital Science KAC-1310 CMOS Image Senson," Eastman Kodak Company, Feb. 8, 2001, http://www.kodak.com/US/plugins/acrobat/en/digital/ccd/kac1310Long.pdf.

Kanade, T., et al, "Virtualized Reality: Digitizing a 3D Time-Varying Event As Is and in Real Time," Proceedings of the International symposium on Mixed Reality (ISMR 99), Spriner-Verlag, Secaucus, NJ, 1999, pp. 41-57.

Longman, J., "Sports Use Technology and T.L.C. to Hold on to Fans," The New York Times, Jul. 31, 2001.

Web page, Xbox Video Game System, Microsoft Corporation, 2001, http://www.xbox.com/hardware/consoles/xbox.htm.

Web page, high definition av pack, Microsoft Corporation, 2001, http://www.xbox.com/hardware/adapters/highdefinitionavpack.htm.

Pollefeys, M., "Self-Calibration and Metric 3D Reconstruction from Uncalibrated Image Sequences," Ph.D. dissertation, Katholieke Universiteit Leuven Haverlee, Belgium, May 1999.

Tran, K.T.L., J. Angwin, "Sony, AOL Announce Agreement to Link PlayStation 2 to Internet," The Wall Street Journal, May 15, 2001.

Hartley, R. and Zisserman, A., Multiple View Geometry in Computer Vision, Cambridge University Press, Cambridge UK, 2000.

Faugeras, O. and Luong, Q-T, "The Geometry of Multiple Images," the MIT Press, Cambridge, MA, 2001.

"Phone Giants Set Standards for Broadband Construction," Associated Press reported in The Wall Street Journal, May 29, 2003.

de Bonvoisin, S., "EU Clears General Motors Takeover of Daewoo Motor," The Wall Street Journal, Dow Jones & Company, Jul. 23, 2002.

Grenier, M.P., "Broadband User Growth Slows as Higher Costs Prove Obstacle," The Wall Street Journal, Dow Jones & Company, Oct. 18, 2001.

Sweet, D., "Where Vince, and Even Luc, Become Human Highlight Reels," The Wall Street Journal, Dec. 6, 2000.

* cited by examiner

METHOD AND APPARATUS FOR REAL-TIME GROUP INTERACTIVE AUGMENTED-REALITY AREA MONITORING, SUITABLE FOR ENHANCING THE ENJOYMENT OF ENTERTAINMENT EVENTS

PRIORITY CLAIM

This application claims the benefit of priority to provisional application No. 60/531,456, filed in the United States on Dec. 19, 2003, and titled "An Interactive Augmented Reality Entertainment System and Service."

BACKGROUND (1) Technical Field

The present invention relates to the fields of computer vision, isochronous networking, parallel computing, augmented reality, media synchronization architecture, and computer game architecture. More specifically, the present invention pertains to a method and system for real-time, group interactive, augmented-reality area monitoring, which is suitable for enhancing the enjoyment of entertainment events performed in an area being monitored. The system is configured to allow a user to interactively augment, in real-time, the display of an entertainment event with user-inputted doodles, user requested information and statistics, and user selected viewing angles. In addition, the system allows a user to interact in real-time with other users viewing the entertainment event.

(2) Discussion

Currently, watching a sporting event from an arena or stadium luxury box is a passive event. There is no way for the sports fan to interact with information about the game or with other similar sports fans. Therefore, there exists a need in the art for a real-time, group interactive, augmented-reality area monitoring system, which is suitable for enhancing the enjoyment of entertainment events performed in an area being monitored, by allowing the users to interact remotely with each other and with information related the entertainment events.

In recent years, many systems have been proposed to allow the fans to choose their own camera angles in entertainment events and to compose their own highlight videos of the events. However, none of the proposed systems are both interactive and real-time, and none of them are designed to be used in the arena. As discussed in "Sports Use Technology and T.L.C. to Hold On to Fans," *The New York Times*, Jul. 31, 2001 by J. Longman, the News Corporation's British Sky Broadcasting (BSkyB) service SkySports in the U.K., currently provides the capability for fans to choose their own camera angles for soccer broadcasts. However, there is no indication that this system has the capability to augment the video with geolocated information interactively requested by the fans, as the present invention does. In the 2001 championship series, the National Basketball Association positioned robotic cameras around the arena and allowed the fans to compose their own highlight videos ten minutes after each quarter ended, as discussed in "Sports Use Technology and T.L.C. to Hold On to Fans," The New York Times, Jul. 31, 2001 by J. Longman. However, even on this case, there is no indication that the capability was provided to the fans to augment the video with information requested by the fans as the present invention does.

Sportvision has several innovative augmented reality products, such as $1^{st}$ and Ten Line, Virtual Caddy, and NASCAR-in-Car, but there is no indication that any of these products are interactive with the fans. Furthermore, according to "The FoxTrak Hockey Puck Tracking System," IEEE Computer Graphics and Applications, March-April 1997, pp. 6-12, discussed by R. Cavallaro, there is no indication that Fox Sports Productions' FoxTrak is interactive with the fans either. In addition, the Graphical Video System of Sharir et al. is not real-time as discussed by Sharir in the Graphical Video System, Orad Hi-Tec Systems Limited, Apr. 30, 2002 (U.S. Pat. No. 6,380,933).

There are several examples of recent companies that provide information-intensive services, such as Quokka Sports, CBS SportsLine, and SkySports which provide in-depth sports information to subscribers. Quokka goes even farther than the others and provides interesting graphical representations for their content. However, none of these companies provide these capabilities on live action.

In addition, there are several examples of companies that provide sports electronic community services, such as SkySports and many others which provide electronic communities for sports discussion, but none of these companies integrate this sports discussion with arena experience, live video, or augmented displays.

Other prior art techniques use augmented reality technology in sports broadcasting, such as the art discussed by Welch et al. in "Computerized video imaging system for creating a realistic depiction of a simulated object in an actual environment," (U.S. Pat. No. 4,970,666) granted Nov. 13, 1990. Here Welch et al. make broad claims about merging virtual images into the real world. However, the patent does not contain any mention of tracking, does not integrate the system with an electronic community service, and does not provide wireless access to this electronic community.

Furthermore, Princeton Video Images has several patents on virtual billboards, including the one discussed in "*System and method for downstream application and control electronic billboard system*," Princeton Video Image, Inc., Aug. 6, 1996 (U.S. Pat. No. 5,543,856) by Rosser et al. However these patents deal with geolocation of images on stationary objects, and these patents are not interactive with the viewer. Also the FoxTrack Hockey Puck patented by Cavallaro in 1997 (U.S. Pat. No. 6,154,250) tracks objects in real-time and in real video, and places graphical objects in real-time video, however the FoxTrack Hockey Puck does not allow fan interaction with the tracked objects.

Sportvision's 1st and Ten Line (U.S. Pat. No. 6,266,100) are real-time systems that track a stationary object (the field), and handles occlusion by players well; however, Sportvision's 1st and Ten Line are not interactive with fans. In addition, the Sportvision's K Zone computer generated strike zone works on replay video, and inserts georegistered graphics into the video, but it is not interactive with fans as discussed by A. Gueziec in the publication "Tracking Pitches for Broadcast Television," *Computer*, March 2002, pp. 38-43.

The system of Sharir et al.'s discussed in the patent "Graphical Video System," Orad Hi-Tec Systems Limited, Apr. 30, 2002, (U.S. Pat. No. 6,380,933) supports generation and insertion of virtual players, however this invention works only from recorded video, and it is not a real-time system.

Other prior art techniques exist in multi-user real-time augmented reality such as the system discussed in "*Multi-User Real-Time Augmented Reality System and Method*," Hughes Electronics Corporation, Nov. 12, 2001 (U.S. Pat. No. 6,317,127) by Daily et al. However, none of these other prior art techniques makes claims to provide interaction with the video content.

In addition, geometry extraction from still images using multiple-view geometry has been shown in "*Self-Calibration and Metric 3D Reconstruction from Uncalibrated Image Sequences*," Ph.D. dissertation, Katholieke Universiteit Leuven, Heverlee, Belgium, May 1999 by M. Pollefeys, in "*Multiple View Geometry in Computer Vision*," Cambridge University Press, Cambridge UK, 2000 by R. Hartley and A. Zisserman, and in "*The Geometry of Multiple Images*," The MIT Press, Cambridge, Mass., 2001, by O. Faugeras and Q-T Luong. However these methods have not used video-only still images, and these methods were not designed to be interactive.

Prior art exists for inserting images into live video broadcasts as discussed in "*System and method of real time insertions into video using adaptive occlusion with a synthetic reference image*," Princeton Video Image, Inc., Sep. 14, 1999, (U.S. Pat. No. 5,953,076), by Astle et al. However the images in this patent are static in the scene, and the patent makes no interactivity claims as discussed by Astle et al.

For the foregoing reasons, there is a great need for a system that performs real-time, group interactive, augmented-reality monitoring of an area, suitable for enhancing the enjoyment of entertainment events, where the system uses user-requested queries to interactively augment in real-time the user's local display of events with user-inputted doodles, user-requested information and statistics, and user selected viewing angles that provide high-quality views of an event. In addition, there is a need for a system that allows users to interactively share their locally augmented-reality display with users of other display centers in real-time, and a system that provides an electronic community for the users before, during, and after the game. So that the users can chat with and razz their friends via WAP enabled phones on the way to the game, continue the same thread during the game, and finish up on the way home and at home from desktop machines. Moreover, there is a further need for a system that allows users to switch their display device to display a video game mode where the user continues the entertainment event (sport game) as the user would like to see the entertainment event (sport game) play out, until the user decides to switch back to live action.

The following references are presented for further background information:

[1] *National Standard for Information Technology—Fibre Channel—Physical and Signaling Interface (FC-PH)*, American National Standards Institute, Inc., Nov. 14, 1994.

[2] "Prices Are Set for GameCube, Xbox, PlayStation 2 Video Game Boxes," Associated Press reported in *The Wall Street Journal*, Dow Jones & Company, May 22, 2001.

[3] Connexion by Boeing, "Frequently Asked Questions," (http://active.boeing.com/connexion/Body.cfm?left=2A).

[4] Cavallaro, R., "The FoxTrak Hockey Puck Tracking System," *IEEE Computer Graphics and Applications*, March-April 1997, pp. 6-12.

[5] SEC Form 10-K for Clear Channel Communications, Inc., Dec. 31, 2001.

[6] de Bonvoisin, S., "EU Clears General Motors Takeover of Daewoo Motor," *The Wall Street Journal*, Dow Jones & Company, Jul. 23, 2002.

[7] Faugeras, O. and Luong, Q-T., *The Geometry of Multiple Images*, The MIT Press, Cambridge, Mass., 2001.

[8] Glaskowsky, P. N., "Microsoft Weighs in With X-Box," *Microprocessor Report*, Cahners Publications, April 2000.

[9] Grenier, M. P., "Broadband User Growth Slows as Higher Costs Prove Obstacle," *The Wall Street Journal*, Dow Jones & Company, Oct. 18, 2001.

[10] Guéziec, A., "Tracking Pitches for Broadcast Television," *Computer*, March 2002, pp. 38-43.

[11] Hartley, R. and Zisserman, A., *Multiple View Geometry in Computer Vision*, Cambridge University Press, Cambridge UK, 2000.

[12] Heinzl, M., "Telecoms Hunt for Broadband 'Killer Apps' to Use Nearly Empty Data Delivery Pipes," *The Wall Street Journal*, Jun. 14, 2001.

[13] Hindus, L. A., "CMOS: The Image of the Future," *Advanced Imaging Magazine*, May 2001, pp. 33-35.

[14] Data sheet, "Kodak Digital Science KAC-1310 CMOS Image Sensor," Eastman Kodak Company, Feb. 8, 2001, (http://www.kodak.com/US/plugins/acrobat/en/digital/ccd/kac1310Long.pdf).

[15] Kanade, T. et al, "Virtualized Reality: Digitizing a 3D Time-Varying Event As Is and in Real Time," *Proceedings of the International Symposium on Mixed Reality (ISMR 99)*, Springer-Verlag, Secaucus, N.J., 1999, pp. 41-57.

[16] Longman, J., "Sports Use Technology and T.L.C. to Hold On to Fans," *The New York Times, Jul.* 31, 2001.

[17] Web page, *Xbox Video Game System*, Microsoft Corporation, (http://www.xbox.com/hardware/consoles/xbox.htm).

[18] Web page, high definition av pack, Microsoft Corporation (http://www.xbox.com/hardware/adapters/highdefinitionavpack.htm).

[19] Pollefeys, M., *Self-Calibration and Metric 3D Reconstruction from Uncalibrated Image Sequences*, Ph.D. dissertation, Katholieke Universiteit Leuven, Heverlee, Belgium, May 1999.

[20] Mills, D. L., *Network Time Protocol (Version 3)*, Network Working Group, Internet Engineering Task Group, March 1992 (http://www.ietf.org/rfc/rfc1305.txt).

[21] Sweet, D., "Professional Sports Teams Use New Technology to Sell Tickets," *The Wall Street Journal*, Jan. 10, 2000.

[22] Sweet, D., "Where Vince, and Even Luc, Become Human Highlight Reels," *The Wall Street Journal*, Dec. 6, 2000.

[23] Tran, K. T. L., J. Angwin, "Sony, AOL Announce Agreement to Link PlayStation 2 to Internet," *The Wall Street Journal*, May 15, 2001.

[24] (U.S. Pat. No. 4,970,666) Welsh et al, Computerized video imaging system for creating a realistic depiction of a simulated object in an actual environment, granted Nov. 13, 1990.

[25] (U.S. Pat. No. 5,543,856) Rosser et al., *System and method for downstream application and control electronic billboard system*, Princeton Video Image, Inc., Aug. 6, 1996.

[26] (U.S. Pat. No. 5,802,284) Karlton et al., *System and method for using cover bundles to provide immediate feedback to a user in an interactive television environment*, Silicon Graphics, Inc., Sep. 1, 1998.

[27] (U.S. Pat. No. 5,953,076) Astle et al., *System and method of real time insertions into video using adaptive occlusion with a synthetic reference image*, Princeton Video Image, Inc., Sep. 14, 1999.

[28] (U.S. Pat. No. 6,154,250) Honey et al., *System for enhancing the television presentation of an object at a sporting event*, Fox Sports Productions, Inc., Nov. 28, 2000.

[29] (U.S. Pat. No. 6,266,100) Gloudemans et al., *System for enhancing a video presentation of a live event*, Sportvision, Inc., Jul. 24, 2001.

[30] (U.S. Pat. No. 6,317,127) Daily et al., *Multi-User Real-Time Augmented Reality System and Method*, Hughes Electronics Corporation, Nov. 12, 2001.

[31] (U.S. Pat. No. 6,380,933) Sharir et al., *Graphical Video System*, Orad Hi-Tec Systems Limited, Apr. 30, 2002.

[32] Yang, S-j, "SKT Launches New Technology in Incheon," *The Korea Herald*, Jan. 28, 2002.

[33] "Phone Giants Set Standards for Broadband Construction," Associated Press reported in *The Wall Street Journal*, May 29, 2003.

[34] Berman, D. K., "Local Bells Look to Fiber to Stem Some Losses," *The Wall Street Journal*, Jun. 19, 2003.

[35] Dockstader, S. L., A. M. Tekalp, "Tracking Multiple Objects in the Presence of Articulated and Occluded Motion," *Proceedings of the Workshop on Human Motion*, Austin, Tex. 7-8 Dec. 2000, pp. 88-95.

[36] Dockstader, S. L., A. M. Tekalp, "Multiple camera tracking of interacting and occluded human motion," *Proceedings of the IEEE*, October 2001, pp. 1441-55.

[37] Web site, "EA Sports NBA Live 2003," Electronic Arts Inc., http://www.easports.com/platforms/games/nbalive2003/home.jsp.

[38] Gavrila, D. M., L. S. Davis, "3-D model based tracking of humans in action: a multi-view approach," Proceedings CVPR '96: 1996 *IEEE Computer Society Conference on Computer Vision and Pattern Recognition*, 18-20 Jun. 1996, San Francisco, 1996.

[39] Li, Z., H. Wang, "Real-Time 3D Motion Tracking with Known Geometric Models," *Real Time Imaging* 5, Academic Press, pp. 167-87.

[40] Web page, "Nokia N-Gage", Nokia, http://www.n-gage.com/n-gage/home.html.

[41] Rehg, J. M., T. Kanade, "Model-based tracking of self-occluding articulated objects," Proceedings, *Fifth International Conference on Computer Vision*, IEEE Computer Society Press, 20-23 Jun. 1995, Cambridge, Mass., 1995, pp. 612-7.

[42] Mills, D. L., *Network Time Protocol (Version 3)*, Network Working Group, Internet Engineering Task Group, March 1992 (http://www.ietf.org/rfc/rfc1305.txt).

[43] Press release, "Yao Ming Basketball by Sorrent to be Distributed Exclusively via QUALCOMM's BREW Solution," QUALCOMM Incorporated, Apr. 29, 2003.

[44] Press release, "Sony Ericsson unveils the T606, a CDMA phone with state-of-the-art mobile entertainment and imaging features," Sony Ericsson, Mar. 4, 2003.

[45] Web page, "Sony Ericsson—Specifications for the T310," Sony Ericsson, Jun. 20, 2003.

[46] Yang, S-j, "SKT Launches New Technology in Incheon," *The Korea Herald*, Jan. 28, 2002.

SUMMARY

The present invention provides a system for real-time, group interactive, augmented-reality area monitoring, suitable for enhancing the enjoyment of entertainment events, the system comprising: a computer system including a processor and a memory coupled with the processor, a "sensor data acquisition system," and a "plurality of display centers" communicatively coupled with the computer system and the sensor data acquisition system, and with each display center connected to a display device. Moreover, the display centers are selected from a group consisting of display centers positioned about the area to be monitored, mobile wireless communication devices, and networked computing devices. The computer system further comprises an interface with the sensor data acquisition system that allows the computer to receive sensor data, in real-time, from a plurality of data acquisition sensors disposed about an area to be monitored, and an input coupled with the processor for receiving a user-provided request to augment the sensor data being displayed at the user's display center, where the sensor data is augmented in real-time with graphical overlays of information related to the specific user-provided request. Furthermore, the computer system comprises an output coupled with the processor for outputting, in a computationally efficient manner, the graphical overlays of information to the plurality of display centers, and means residing in its processor and memory for: selecting a data acquisition sensor from which to display data to a display center; controlling the viewing angle of the selected data acquisition sensor in order to orient the data acquisition sensor at a chosen viewing angle; communicating in real-time between the plurality of display centers, in order to allow a user of a display center to interact with users of other display centers; and locally augmenting the display of the sensor data with user input.

Furthermore, the means for communicating in real-time between the plurality of display centers further comprises an "interaction-selector" that allows a user of a display center to selectively choose which other display centers to interact with, so that a user of a selected display center iteratively sends graphical overlays of information (related to a specific user-provided request) to the display devices of other selected to interact with display centers. In addition, a user of a selected to interact display center may choose to cancel the interaction with any other display center at any time.

Generally, the user-provided inputs comprise requests such as: choosing a particular data acquisition sensor from which to display sensor data at the user's display center; choosing a specific viewing angle to be used to orient the previously chosen data acquisition sensor; requesting access to information of interest related to the current events happening in the area being monitored; requesting access to information of interest related to prior events related to the current events happening in the area being monitored; requesting to display on the plurality of display centers a graphical doodle overlay, which is created from a doodle inputted by the user drawing on an electronic writing device connected to the display center; and requesting to change the user's display center to game mode, which allows the user to continue the current events happening in the area being monitored as the user would like to see the current events play out until the user decides to switch back the display device to display the live action captured by the data acquisition sensors.

In a further embodiment, the present invention comprises a "central data augmenting system," an "object recognition system," a "current-event database," a "related-information database," and a "recognition-information database." In this embodiment, the recognition-information database is connected with the object recognition system and with the central data augmenting system so that a user may select a segment or an object present in the sensor data to be recognized, so that the object recognition system automatically recognizes the object selected and extracts information regarding the recognized object from the recognition information database. Therefore, the object recognition system receives sensor data from the data acquisition system, recognizes the user selected segment of the sensor data, and extracts the information regarding the recognized segment from the recognition-information database. Next the object recognition system provides the central data augmenting system with the information regarding the recognized segment. Then, the central data augmenting system, which is coupled with the sensor data acquisition system and the object recognition system, centrally augments the sensor data captured by the data acquisition sensors with the information provided by the object recognition system before the sensor data is received by the display centers. In addition, when a user requests to have access to information of interest related to the current events happening in the area being monitored, the central data augmenting system further augments the sensor data with the information stored in the current-event database, which is connected with the display center and with the central data augmenting system. Likewise, when a user requests to have access to information of interest related to prior events, wherein the prior events are related to the current events happening in the area being monitored, the central data augmenting system further augments the sensor data with the information stored in the related-information database, which is connected with the display center and with the central data augmenting system.

In another embodiment of the present invention, the embodiment comprises a "data-marker" and an "audio-marker" for marking the sensor data received from the data acquisition sensors, wherein the data acquisition sensors include at least one of a video camera capturing video frames, an audio recording sensor, and a video/audio camera that records video signals and audio signals concurrently, and wherein the video camera is oriented at a line-of-sight (LOS) orientation viewing angle during a video frame. The data-marker marks the sensor data received from a video camera with a "time-tag" corresponding to a video frame and with the line-of-sight (LOS) orientation angle of the video camera at the video frame. Then the audio-marker marks the recorded audio signal with a "time-tag" corresponding to the video frame synchronized with the recorded audio signal.

In yet another embodiment, the object recognition system further comprises a "tracker," a "model-extractor," a "parameter-extractor," a "model-matcher," a "time-marker," an "activity-storage," and a "spatially-registered geometric model database." This embodiment of the invention uses the tracker to detect object features that represent a recognized object, and to track these object features in the sensor data marked with a "time-tag" and a (LOS) orientation angle, thus effectively finding the feature locations of the object features in the data acquisition sensors. Then the tracker creates "three-dimensional feature location data" by fusing the feature locations of the object features from the plurality of data acquisition sensors, and tracks this "three-dimensional feature location data" in the data acquisition sensors over time. In turn, the model-extractor extracts "spatially-registered geometric models" of objects present in the sensor data from the "three-dimensional feature location data", and in addition, the model-extractor also extracts "texture models" from the current video frame based on the location of the spatially-registered geometric models in the area being monitored. Next, the parameter-extractor extracts "time-tagged parameters" from the spatially-registered geometric models, and outputs these time-tagged parameters, which characterize the objects being recognized, to the object recognition system.

In this embodiment, the area being monitored includes at least one actor performing an activity, such as a player playing basketball, and the embodiment further comprises a data acquisition sensor disposed on the actor so that a user at a display center can select both the actor to be tracked by the data acquisition sensor and the specific data acquisition sensor to be disposed on the selected actor. Then the model-matcher associates a spatially-registered geometric model generated by the object recognition system with an actor performing an activity, and then the time-marker time-tags this spatially-registered geometric model of the actor. Next, the activity-storage stores a time sequence of activities performed by the actor by using the "time-tagged spatially-registered geometric models of the actor." Then, the time sequence of activities performed by an actor and the spatially-registered geometric model of the actor are stored in the spatially-registered geometric model database, so that a user may select a spatially-registered geometric model for display on the display centers, or so that a user may select to recreate prior activities by displaying on the display centers a time sequence of activities previously performed by a specific actor.

In another embodiment of the present invention, the central data augmenting system further comprises a "visual-renderer," a "doodle-renderer," and a "compositor." In this embodiment, the visual-renderer renders a time-tagged visual representation overlay of the spatially-registered geometric models of objects present in the sensor data by combining information provided by the current-event database and the related-information database with the spatially-registered geometric models and the viewing angle selected by the user. In addition, the visual-renderer provides the user with a plurality of choices of time-tagged visual representation overlays for each input query requested by the user.

Furthermore, the doodle-renderer renders "time-tagged graphical doodle overlays" from doodles inputted by the user drawing on an electronic writing device that is connected to the user's display center. The doodle-renderer allows the user to choose between an absolute position for the doodles to be placed on the "time-tagged graphical doodle overlays," where the absolute position is spatially-registered to the monitored area, or to choose a relative position for the doodles to be placed on the "time-tagged graphical doodle overlays," where the relative position is spatially-registered to an object within the monitored area. Then the doodle-renderer renders the time-tagged graphical doodle overlay by combining the inputted doodles, the absolute position of the doodles or the relative position of the doodles, the spatially-registered geometric models, and the viewing angle selected by the user.

Then, the compositor generates a "composited augmented reality audiovisual media stream" by combining together the user selected time-tagged visual representation overlay provided by the visual-renderer, the time-tagged video frames from the data acquisition sensors, the time-tagged audio signal, and the time-tagged graphical doodle overlay provided by the doodle-renderer. Finally, the compositor sends the "composited augmented reality audiovisual media stream" to be displayed on the display centers.

In yet another embodiment, the present invention is used to allow the user of a display center to switch the display device to display a video game mode by incorporating a "game mode system" into the embodiment of the present invention. This game mode system allows the user to switch the display device to display a video game mode where the user continues the current events happening in the area being monitored (usually a sports game) as the user would like to see the current events play out, until the user decides to switch back the display device to display the live action captured by the data acquisition sensors. Furthermore, the spatially-registered geometric models of the actors supplied by the object recognition system and the information stored in the current-event database reflecting the state of the current event (sports game) are used as the initial states for the game engine used with the game-mode system.

Furthermore, the present invention in all of its previously discussed embodiments can be used with a single display center instead of a plurality of display centers, so that a single user may request any input query previously discussed to locally augment his/her display center, without having to interact with any other users.

The features of the above embodiments may be combined in many ways to produce a great variety of specific embodiments, as will be appreciated by those skilled in the art. Furthermore, the means which comprise the apparatus are analogous to the means present in computer program product embodiments and to the acts in the method embodiment.

BRIEF DESCRIPTION OF THE DRAWINGS

The objects, features, aspects, and advantages of the present invention will become better understood from the following detailed descriptions of the preferred embodiment of the invention in conjunction with reference to the following appended claims, and accompanying drawings where:

DETAILED DESCRIPTION

Figure 1:
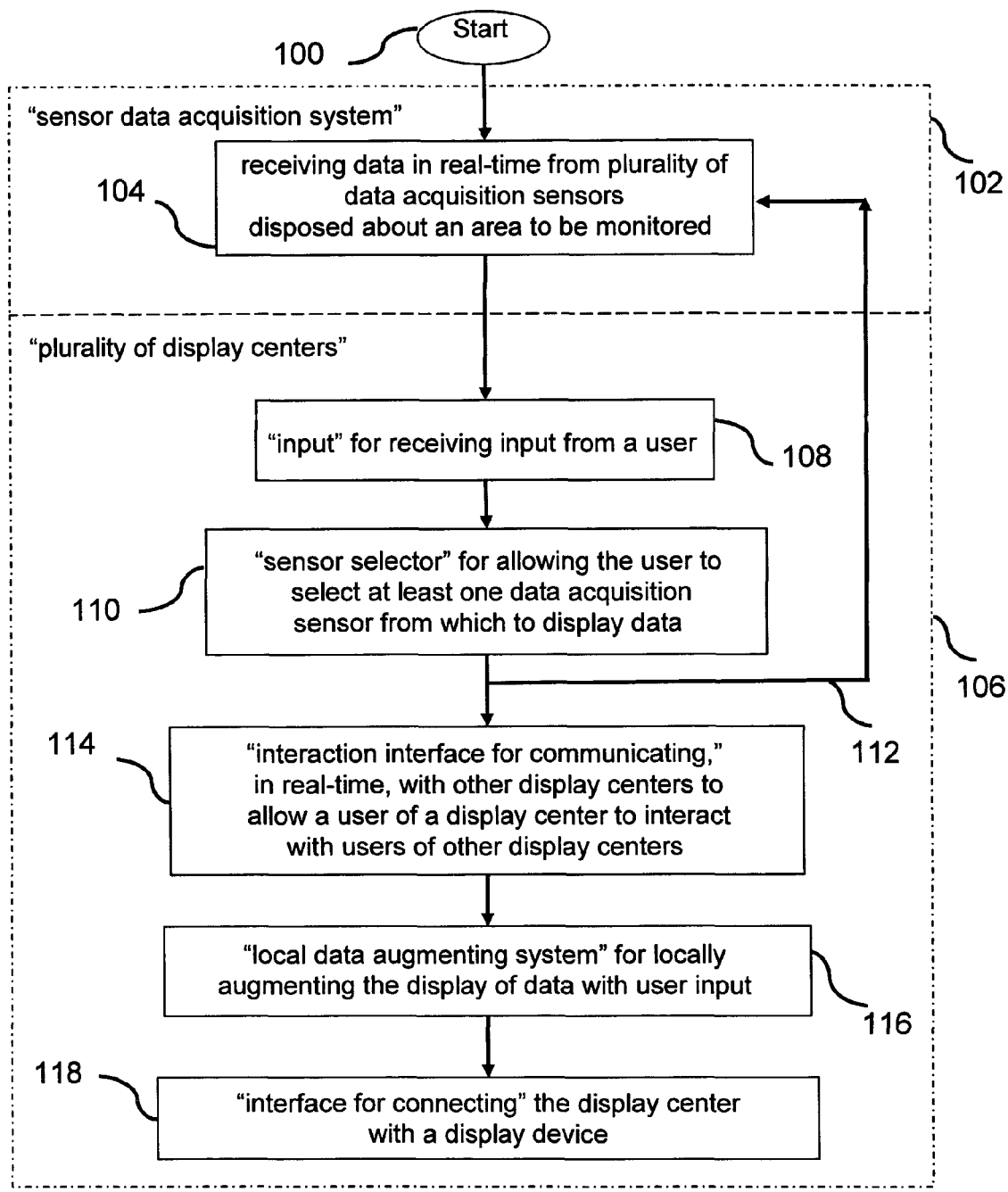
FIG. 1 is a flow chart depicting the operating modules/acts/means of the present invention.

The present invention relates to the fields of computer vision, isochronous networking, parallel computing, augmented reality, media synchronization architecture, and computer game architecture. More specifically, the present invention pertains to a method and system for real-time, group interactive, augmented-reality area monitoring, which is suitable for enhancing the enjoyment of entertainment events performed in the area being monitored. The following description, taken in conjunction with the referenced drawings, is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein. Furthermore it should be noted that, unless explicitly stated otherwise, the figures included herein are illustrated diagrammatically and without any specific scale, as they are provided as qualitative illustrations of the concept of the present invention.

In order to provide a working frame of reference, first a glossary of some of the terms used in the description and claims is given as a central resource for the reader. The glossary is intended to provide the reader with a general understanding of various terms as they are used in this disclosure, and is not intended to limit the scope of these terms. Rather, the scope of the terms is intended to be construed with reference to this disclosure as a whole and with respect to the claims below. Next, a brief introduction is provided in the form of a narrative description of the present invention to give a conceptual understanding prior to developing the specific details. Finally, a detailed description of the elements is provided in order to enable the reader to make and use the various embodiments of the invention without involving extensive experimentation.

(1) Glossary

Before describing the specific details of the present invention, it is useful to provide a centralized location for various terms used herein and in the claims. Definitions have been included for these various terms. However, the definitions provided should not be considered limiting to the extent that the terms are known in the art. These definitions are provided to assist in the understanding of the present invention.

Computer-readable media—The term "computer-readable media," as used herein, denotes any media storage device that can interface with a computer and transfer data back and forth between the computer and the computer-readable media. Some non-limiting examples of computer-readable media are: an external computer connected to the system, an internet connection, a Compact Disk (CD), a Digital Versatile Disk/Digital Video Disk (DVD), a floppy disk, a magnetic tape, an internet web camera, a direct satellite link, a video cassette recorder (VCR), a removable hard drive, a digital camera, a video camera, a video cassette, an electronic email, a printer, a scanner, a fax, a solid-state recording media, a modem, a read only memory (ROM), and flash-type memories.

Data-acquisition sensors—The term "data acquisition sensors," as used herein, denotes any sensors used to capture information and sensor data from a scene or an area, and store this information in a recording media. Some non-limiting examples of data acquisition sensors are: a still camera, a video camera, an audio recording sensor, a microphone, a video/audio camera, a digital camera, a picture-enabled cell phone, a scanner, a fax machine, an internet web camera, a video cassette recorder (VCR), and a solid-state recording media.

Data-augmenting system—The term "data augmenting system," as used herein, is used to denote a system that allows a user to augment, or modify, the visual display and audio display of the sensor data captured by the data acquisition sensors with user-inputted doodles, user selected viewing angle of a data acquisition sensor, and user requested information and statistics.

Doodle—The term "doodle," as used herein, is a standard term used to denote a graphical drawing, a figure, a design, or a scribble drawn or written absent-mindedly.

Group interactive—The term "group interactive," as used herein, denotes the capability of a system to allow a user to communicate back and forth, in real-time, with a plurality of other users connected to the system. Some non-limiting examples of how a user is connected to the system are: a user-connected through a display center positioned about the area being monitored, a user-connected via a mobile wireless communication device, and a user-connected via a networked computing device.

GUI—An acronym for "Graphical User Interface." The term "GUI," as used herein, is a standard term used to denote a graphical computer interface that allows the user to interact with the computer by providing inputs or queries to the computer, and in turn receiving outputs or results from the computer.

Input—The term "input," as used herein, is used to denote any device used to receive input from a user. Some non-limiting examples of input devices are: a keyboard, a microphone, a computer mouse, a wireless signal communication, a game engine, and an electronic writing device, wherein the electronic writing device permits a user to write notes and to draw doodles on a pad to be transferred to a computer by use of a special electronic ball point pen.

LOS: An acronym for "Line-Of-Sight." The term "Line-Of-Sight," as used herein, is a standard term used to indicate a measurement of the orientation viewing angle of a digital video camera, wherein the "Line-Of-Sight" (LOS) measurement is composed by the measurements of the pitch and yaw angle of the digital camera.

Means—The term "means" when used as a noun with respect to this invention generally indicates a set of operations to be performed on a computer, and may represent pieces of a whole program or individual, separable, software (or hardware) modules. Non-limiting examples of "means" include computer program code (source or object code) and "hard-coded" electronics. The "means" may be stored in the memory of a computer or on a computer readable medium. In some cases, however, the term "means" refers to a class of device used to perform an operation, and thus the applicant intends to encompass within this language any structure presently existing or developed in the future that performs the same operation.

On-line—The term "on-line," as used herein, is a standard term used to denote "under the control of a central computer," as in a manufacturing process or an experiment. On-line also means to be connected to a computer or computer network, or to be accessible via a computer or computer network.

Real-time—The term "real-time," as used herein, is a standard term used to relate to computer systems that update information, or perform a task, at the same rate as they receive data.

Recording media—The term "recording media," as used herein, denotes any media used to store information about an object or a scene. Some non-limiting examples of recording media are: a video film, a video recording tape, an audio recording tape, an audio cassette, a video cassette, a video home system (VHS) tape, an audio track, a Compact Disk (CD), a Digital Versatile Disk/Digital Video Disk (DVD), a floppy disk, a removable hard drive, a digital camera, a solid-state recording media, a printed picture, a scanned document, a magnetic tape, and a faxed document.

Time-Tag—The term "time-tag," as used herein, is a standard term used to denote a time marker placed on either video data or audio data, in order to be able to track in time the precise instant when a video frame was captured or an audio signal was recorded.

User—The term "user," as used herein, is a standard term used to denote a person utilizing the method for automatically extracting geospatial features from multi-spectral imagery.

(2) Overview

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

Some portions of the detailed description are presented in terms of a sequence of events and symbolic representations of operations on data bits within an electronic memory. These sequential descriptions and representations are the means used by artisans to most effectively convey the substance of their work to other artisans. The sequential steps are generally those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals by terms such as bits, pixels, values, data, video frames, audio signals, elements, files, and coefficients.

It is to be understood, that all of these, and similar terms, are to be associated with the appropriate physical quantities, and are merely convenient labels applied to these quantities. Unless specifically stated otherwise as apparent from the following discussions, it is appreciated that throughout the present disclosure, discussions utilizing terms such as "processing," "calculating," "extracting," "determining," "inputting," "augmenting," "communicating," "interacting," "interfacing," "acquiring," "controlling," "recognizing," "matching," "tracking," "modeling," "obtaining," "outputting," or "displaying" refer to the action and processes of a computer system, or similar electronic device that manipulates and transforms data represented as physical (electronic) quantities within the system's registers and memories into other data similarly represented as physical quantities within the computer system memories or registers or other such information storage, transmission, or display devices. Furthermore, the processes presented herein are not inherently related to any particular processor, processor component, computer, software, or other apparatus.

The present invention, in a preferred embodiment, provides a system for real-time, group interactive, augmented-reality area monitoring, which is suitable for enhancing the enjoyment of entertainment events performed in the area being monitored. The system includes a "sensor data acquisition system" for receiving sensor data, in real-time, from a plurality of data acquisition sensors disposed about an area to be monitored. Once the data acquisition sensors start receiving sensor data, the system sends the sensor data to a "plurality of display centers," which are communicatively coupled with the data acquisition system. Each display center comprises an "input" for receiving input from a user, a "sensor selector," an "interaction interface for communicating" in real-time with users of other display centers, an "interface for connecting" a display device, and a "local augmenting system" for locally augmenting the display of the sensor data with user input. In addition to the "sensor selector" which allows a user to select a particular data acquisition sensor from which to display sensor data, a display center further comprises an "angle-controller" for controlling the viewing angle of the selected data acquisition sensor. The input received from an user in a display center comprises a request for information related to the entertainment event, a request for orienting a specific data acquisition sensor at a specific viewing angle, a message to be sent to other users, and a "doodle" used to locally augment the display of the sensor data, wherein the "doodle" comprises hand written text and hand drawn sketches.

Therefore, the system is configured to allow a user to interactively augment in real-time the local display of an entertainment event with user-inputted doodles, user-requested information and statistics, and a specific user-selected viewing angle. In addition, the system allows a user to interactively share the locally augmented-reality display with users of other display centers by using the "interaction interface."

The system further includes a "current-event database" and a "related-information database" connected with the display centers, whereby users in the display centers can access information of interest related to current events in the area being monitored or related to prior events that are related or relevant to the current events in the area being monitored. That is, in the case when the current entertainment event being monitored is a sport's game, the user can request information related to the performance of a specific player during the current game and related to the performance statistics of the specific player during prior games.

In addition, the system comprises a "data-marker" and an "audio-marker" used to mark the sensor data received from the data-acquisition sensors with a "time-tag" corresponding to a video frame (captured with a video camera) synchronized with its corresponding audio signal (captured with a microphone). That is, the "data-marker" attaches to the sensor data a "time-tag," corresponding to a video frame, and attaches to the sensor data a line-of-sight (LOS) orientation angle, corresponding to the orientation angle of the video camera used to capture the corresponding video frame. Correspondingly, the "audio-marker" attaches to the audio signal a "time-tag" corresponding to the video frame synchronized with the audio signal.

In a preferred embodiment of the present invention, the system includes an "object recognition system" designed to recognize a segment of the sensor data selected by the user, wherein the segment contains an object or an actor performing an activity. Once the "object recognition system" recognizes the segment of interest, the system provides the user with information regarding the segment of interest by extracting relevant information concerning the recognized object from a "recognition-information data base" connected with the object recognition system.

In an embodiment of the invention, the "object recognition system" comprises a "tracker" for tracking the sensor data marked with "time-tag" and (LOS) orientation angle, a "model-extractor" for extracting spatially-registered geometric models of objects present in the sensor data, and a "parameter-extractor" for extracting time-tagged parameters from the spatially-registered geometric models. The object recognition "tracker" detects object features that represent a recognized object, finds feature locations of the object features in the data-acquisition sensors, creates three-dimensional feature location data by fusing the feature locations of the object features from the plurality of data-acquisition sensors, and tracks the three-dimensional feature location data in the data acquisition sensors over time. Next, the "model-extractor" extracts "spatially-registered geometric models" from the three-dimensional feature location data. In addition, the "model-extractor" also extracts texture models from the current video frame based on the location of the spatially-registered geometric models within the area being monitored. Then, the "parameter-extractor" extracts time-tagged parameters from the spatially-registered geometric models, and outputs these time-tagged parameters, characterizing the recognized object, along with its corresponding spatially-registered geometric models to a "spatially-registered geometric model database" connected with the "object recognition system."

The "spatially-registered geometric model database" not only stores the spatially-registered geometric model generated by the object recognition system which characterizes a user selected actor, but it also stores a time sequence of activities performed by the actor. This allows the user to select a specific spatially-registered geometric model to be displayed on the display center, and also allows the user to select to recreate prior activities by displaying on the display center a time sequence of activities previously performed by a specific actor.

Furthermore, in a preferred embodiment of the present invention, the system includes a "central data augmenting system" design to centrally augment sensor data from the data acquisition sensors before the sensor data is received by the display centers. This allows a user to globally augment the display devices of other display centers, in addition to locally augmenting the user's display device, provided that other users at other display centers grant permission to the user to augment their display devices. The central data augmenting system comprises a "visual-renderer" for rendering time-tagged visual representation overlays of the spatially-registered geometric models of objects present in the sensor data, a "doodle-renderer" for rendering time-tagged graphical doodle overlays inputted by the user, and a "compositor" for composing a time-tagged visual representation overlay onto the video frames from the data acquisition sensors for display on the display centers. The "visual-renderer" renders a time-tagged visual representation overlay by combining information provided by the "current-event database" and the "related-information database" with the viewing angle selected by the user and with the spatially-registered geometric models provided by the "object recognition system." In addition, the "visual-renderer" provides the user with a plurality of choices of time-tagged visual representation overlays for each input query requested by the user.

The "doodle-renderer" works by allowing a user to draw doodles on an electronic writing device connected to a display center, and then giving the choice to the user between an absolute position for the doodles (where the absolute position is spatially-registered to the monitored area) or a relative position for the doodles (where the relative position is spatially-registered to an object within the monitored area). Then, the "doodle-renderer" renders a time-tagged graphical doodle overlay by using the inputted doodles, the absolute position or the relative position of the doodles, the spatially-registered geometric models, and the viewing angle selected by the user.

Once the user selects, from the "visual-renderer," which time-tagged visual representation overlay to display, the "compositor" generates a composited augmented reality audiovisual media stream by combining the selected time-tagged visual representation overlay, the time-tagged video frames, the time-tagged audio signal, and the time-tagged graphical doodle overlay. Then, the user of the display center selectively chooses which other display centers to interact with and sends the composited augmented reality audiovisual media stream to the selected to interact with display centers. In turn the users of the selected to interact display centers may accept (or reject) the interaction with the particular user by using an "interaction-selector" that enables (or disables) their display devices to be augmented by external user input. This allows a user of a display center to iteratively interact with users of other display centers. Furthermore, the system also allows a user to cancel the interaction with a particular display center at any time.

In cases when the activity performed in the area is a sport game played by a plurality of players, the system in a preferred embodiment comprises a "game mode system" which allows the user to switch the display device to display a video game mode. During the video game mode the user continues the sport game as the user would like to see the sport game play out, until the user decides to switch back the display device to display the live action captured by the video cameras.

Furthermore, the present invention allows a user of a display center to interact remotely in real-time with users of other display centers, wherein any of the display centers may be positioned about the area being monitored, or may be a mobile wireless communication device, or may be a networked computing device. Therefore, a user of the present invention does not have to be physically located close to the area being monitored.

A flow chart depicting the operating modules of the present invention is shown in FIG. 1. The blocks in the diagram represent the functionality of the apparatus of the present invention. The flow chart is divided into two portions, representing the "sensor data acquisition system" portion 102 and the "plurality of display centers" portion 106, which contains the elements 108, 110, 112, 114, 116, and 118, which will be subsequently described in greater detail. After starting 100, the embodiment of the present invention accesses the "sensor data acquisition system" portion 102 which performs the operation 104 of receiving sensor data in real-time from a plurality of data acquisition sensors disposed about an area to be monitored. The data acquisition sensors are comprised of, but not limited to, a video camera, an audio recording sensor, a microphone, a digital camera, an interne web camera, a solid state recording media, a picture-enabled cell phone, and a video/audio camera that records video signals and audio signals concurrently. Then the present invention sends the received sensor data to a "plurality of display centers" portion 106. In this embodiment, each display center is comprised of an "input" for receiving input from a user 108, a "sensor selector" 110, an "interaction interface for communicating" 114, a "local data augmenting system" 116, and an "interface for connecting" 118 the display center with a display device.

In an embodiment of the invention, the user provides the system with different input requests such as: choosing a particular data acquisition sensor from which to display sensor data; choosing a specific viewing angle to be used to orient a previously chosen data acquisition sensor; choosing to interact with other specific display centers; requesting access to information of interest related to the current events in the area being monitored; requesting access to information of interest related to prior events related to the current events in the area being monitored; requesting to recreate prior activities by displaying on the display centers a time sequence of activities previously performed by an actor in the area being monitored; requesting to display to other display centers a graphical doodle overlay inputted by the user drawing doodles on an electronic writing device connected to their display center; and requesting to change the user's display center to game mode thus allowing the user to continue a sport event being monitored as the user would like to see the sport event play out until the user decides to switch back the display device to display live action captured by the data acquisition sensors.

After performing the operation 108 of receiving the input form the user, this embodiment of the present invention accesses a "sensor selector," element 110, which allows the user to select at least one data acquisition sensor from which to display sensor data. Then the embodiment sends a signal 112 back to the "sensor data acquisition system" portion 102, where the signal 112 contains the information concerning which data acquisition sensors (from which to display sensor data) were selected by the user. Next the "sensor data acquisition system" portion 102 sends only the sensor data captured by the user selected data acquisition sensors to the display center of the user.

In addition to allowing the user to select which data acquisition sensor to display sensor data from, the embodiment of the invention allows the user to interact with other display centers by using an "interaction interface for communicating" in real-time with other display centers, element 114, and the embodiment also allows the user to locally augment the display of the sensor data with user input by using a "local data augmenting system," element 116. Furthermore, a user may choose at any time to interact with other display centers, and in turn the users of the selected to interact display centers may accept (or reject) the interaction with the particular user by using an "interaction-selector" that enables (or disables) their display devices to be augmented by external user input. This allows a user of a display center to control his/her iterative interaction with users of other display centers. Meanwhile, the embodiment also allows a user to cancel the interaction with a particular display center at any time. Moreover, a user may augment at anytime their own local display by using the "local data augmenting system," element 116, which allows the user to overlay on the local display user-drawn doodles, information of interest related to the current events in the area being monitored, and information of interest related to prior events related to the current events. At the same time, the user may chose to share the augmented local display with other display centers by using the "interaction interface for communicating," element 114.

In this embodiment, the present invention uses an "interface for connecting" the display center with a display device, element 118, wherein the display device is comprised of, but not limited to, a computer monitor, television, an audio loudspeaker, a head-phone, an ear-phone, a score board, a billboard, a projection screen, a cell-phone, an internet web camera, an internet-enabled game-phone, and a game engine.

The blocks in the flowchart of FIG. 1 may also be viewed as a series of functional modules and sub-modules, representing either software or hardware modules depending on the particular embodiment. These modules operate within the processor and memory of a general-purpose or special-purpose computer system and may be in the form of software instructions or "hard-coded" electronic circuits.

(3) Principal Embodiments of the Present Invention

The present invention has three principal "principal" embodiments. The first is an apparatus for real-time, group interactive, augmented-reality area monitoring, suitable for enhancing the enjoyment of entertainment events, typically but not limited to a computer system operating software in the form of a "hard coded" instruction set, wherein the computer system is communicatively coupled with a sensor data acquisition system and with a plurality of display centers. This apparatus may also be specially constructed, as an application-specific integrated circuit (ASIC), or as a readily reconfigurable device such as a field-programmable gate array (FPGA). The second principal embodiment is a method, typically in the form of software, operated using a data processing system (computer).

The third principal embodiment is a computer program product. The computer program product generally represents computer readable code stored on a computer readable medium such as an optical storage device, e.g., a compact disc (CD) or digital versatile disc (DVD), or a magnetic storage device such as a floppy disk or magnetic tape. Other, non-limiting examples of computer readable media include hard disks, read only memory (ROM), and flash-type memories. These (aspects) embodiments will be described in more detail below.

Figure 2:
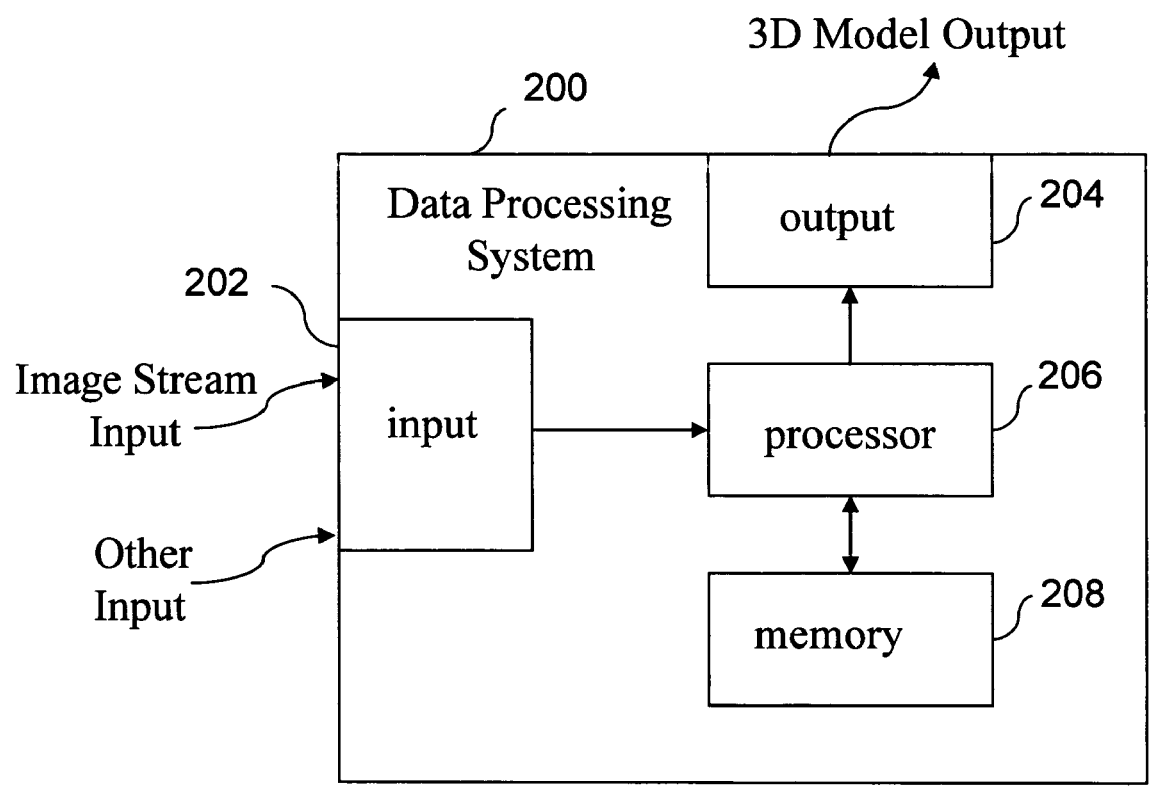
FIG. 2 is a block diagram depicting the components of a computer system used with the present invention.

A block diagram depicting the components of a computer system used in the present invention is provided in FIG. 2. The data processing system 200 comprises an input 202 for receiving sensor data, in real-time, from a plurality of data acquisition sensors disposed about an area to be monitored such as, video camera, an audio recording sensor, a microphone, a digital camera, an interne web camera, a solid state recording media, a picture-enabled cell phone, a video/audio camera, or from any computer readable medium such as a floppy disk, Compact Disk (CD), a Digital Versatile Disk/Digital Video Disk (DVD), and a removable hard drive. The input 202 may also be configured for receiving user input from another input device such as a microphone, keyboard, drawing pads that allows a user to write notes by hand and draw doodles on the pad, a computer mouse, a wireless signal communication, or a game engine, in order for the user to request to the system to augment the user's local display by overlaying on the local display the user drawn doodles, or information of interest related to the current events or prior events related to the current events in the area being monitored. Note that the input 202 may include multiple "ports" for receiving sensor data and user input, and may also be configured to receive information from remote databases using wired or wireless connections. The output 204 is connected with the processor for providing output to the user, not only on a display center but also possibly through audio or kinesthetic signals (e.g., through pinching, vibrations, heat, etc.). Output may also be provided to other devices or other programs, e.g., to other software modules, for use therein, possibly serving as a wired or wireless gateway to external databases or other processing devices. The input 202 and the output 204 are both coupled with a processor 206, which may be a general-purpose computer processor or a specialized processor designed specifically for use with the present invention. The processor 206 is coupled with a memory 208 to permit storage of data and software to be manipulated by commands to the processor. Typical manifestations of the data processing system 200 may be incorporated into vehicles, cellular phones, portable digital assistants, and computers. It should be recognized by those skilled in the art that multiple processors may also be used and that the operations of the invention can be distributed across them.

Figure 3:
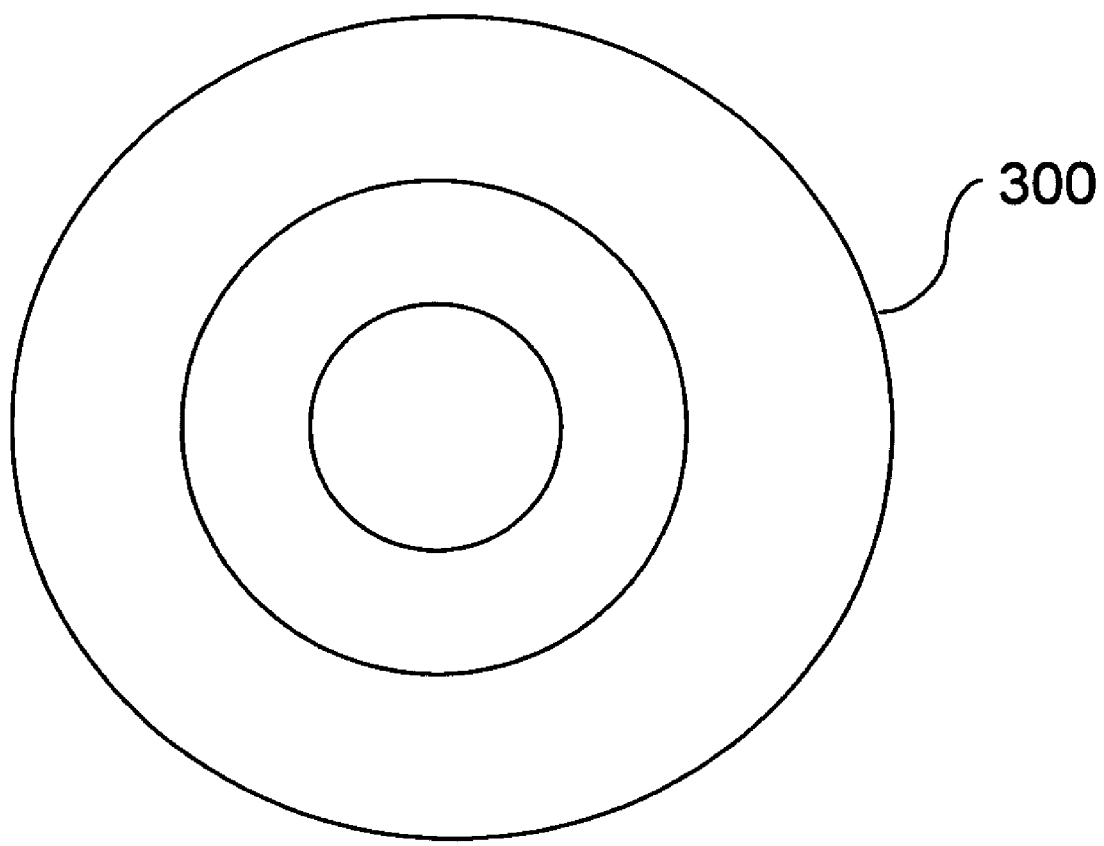
FIG. 3 is an illustrative diagram of a computer program product embodying the present invention.

An illustrative diagram of a computer program product embodying the present invention is depicted in FIG. 3. The computer program product 300 is depicted as an optical disk such as a CD or DVD. However, as mentioned previously, the computer program product generally represents computer-readable code stored on any compatible computer-readable medium.

(4) Detailed Description of the Elements

Figure 4:
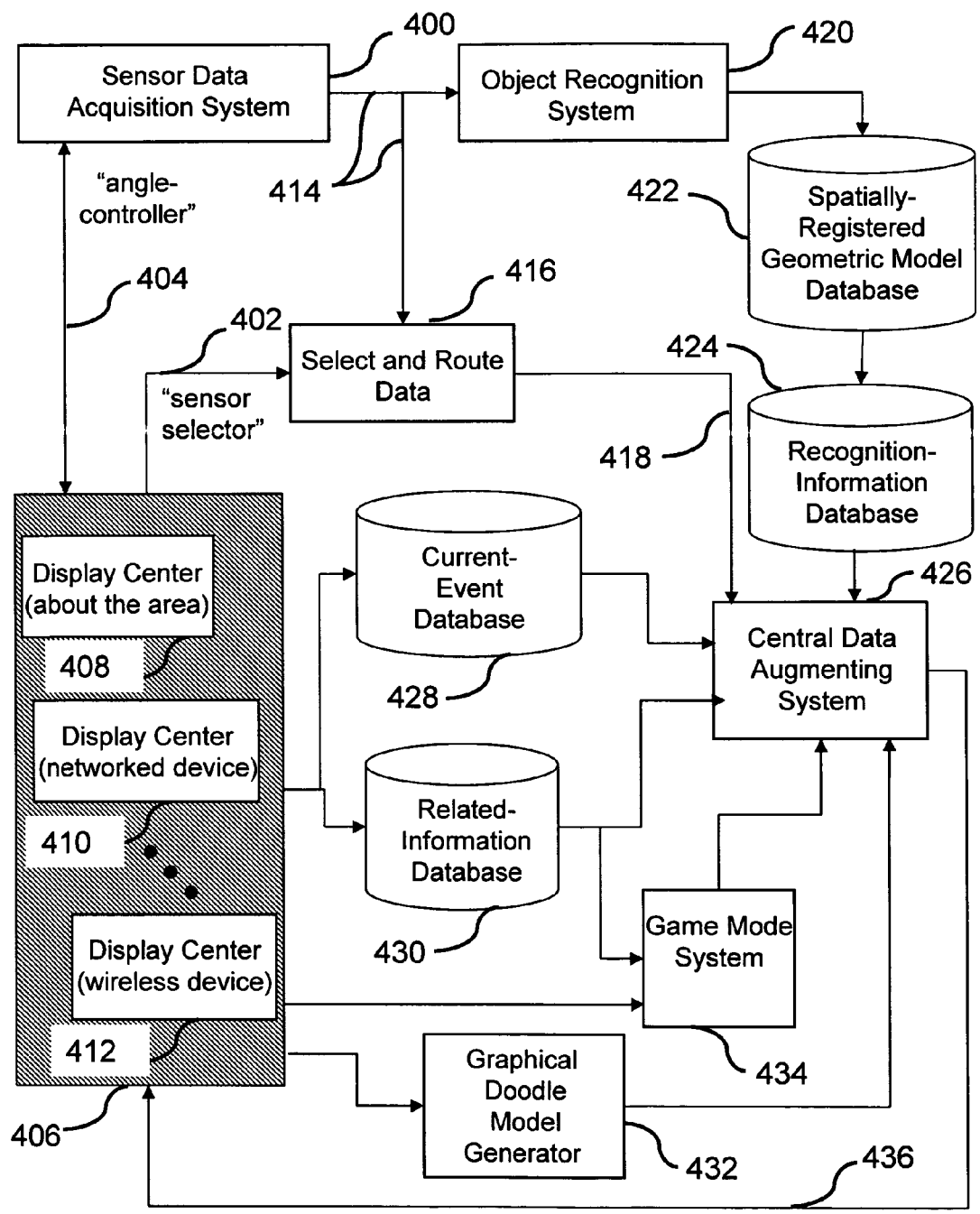
FIG. 4 is a flow chart depicting the operating modules/acts/means of a second embodiment of the present invention.

A detailed description of an embodiment of the present invention, a real-time, group-interactive, augmented-reality system for monitoring an area, suitable for enhancing the enjoyment of entertainment events, is presented, as set forth schematically in a flow chart shown in FIG. 4. In this detailed embodiment, the blocks in the diagram represent the functionality of the apparatus of the present invention. At the start, the system accesses the "sensor data acquisition system" 400 where sensor data is received, in real-time, from a plurality of data acquisition sensors disposed about an area to be monitored, wherein the term 400 corresponds to the previously described portion 102. In addition the embodiment of the invention allows a user to select at least one particular data acquisition sensor from which to display sensor data by using a "sensor selector" signal 402. At the same time, the embodiment further allows the user to select a corresponding "viewing angle" for each selected data acquisition sensor by using an "angle-controller" signal 404, such that a selected data acquisition sensor should be oriented at its corresponding user-selected "viewing angle." Therefore, the "sensor data acquisition system" 400 receives the user-selected "viewing angle" information through the "angle-controller" signal 404 sent from the "plurality of display centers" 406, wherein the user of an individual display center may choose a different viewing angle from the viewing angles selected by users of other display centers. Element 406 corresponds to the previously described element 106, where the detailed components of the "sensor data acquisition system" portion 106 were described above in relation to FIG. 1. The "plurality of display centers" 406 communicatively coupled with the "sensor data acquisition system" 400 may be selected from a group consisting of display centers positioned about the area being monitored 408, networked computing devices 410, and mobile wireless communication devices 412.

Next, the "sensor data acquisition system" 400 sends the sensor data signals 414, captured by a plurality of data acquisition sensors and oriented at the user-selected viewing angles provided by the "angle-controller," to the "select and route data" module 416. Each of these sensor data signals 416 is marked, using a "data-marker" and an "audio-marker," with a "time-tag" and with its corresponding line-of-sight (LOS) orientation angle (user-selected viewing angle). Then, the "select and route data" module 416 sends only the time-tagged LOS-marked sensor data signals corresponding to the data sensors selected by the user, signals 418, to the "central data augmenting system" 426, in order to centrally augment the sensor data from the data acquisition sensors before the sensor data is received by the display center of the user requesting the particular sensor oriented at the user-selected viewing angle. Specifics regarding an embodiment of the "central data augmenting system" 426 will be presented later (shortly) with respect to this FIG. 4.

In addition, the time-tagged LOS-marked sensor data signals 414 are also sent to the "object recognition system" 420 in order to recognize a segment of the sensor data. The "object recognition system" 420 uses a "tracker" to detect object features that represent a recognized object or segment, and to create "three-dimensional feature location data" by fusing the feature locations of the object features extracted from a plurality of data acquisition sensors. Then the "object recognition system" 420 uses a "model-extractor" to extract "spatially-registered geometric models" of the objects (segments) present in the data from their "three-dimensional feature location data." Next the "spatially-registered geometric models" of the objects (segments) present in the data are stored in a "spatially-registered geometric model database," element 422. The models stored in the "spatially-registered geometric model database," element 422, are compared with the objects (segments) stored in a "recognition information database," element 424, in order to recognize the objects (segments) modeled by the "spatially-registered geometric models." Once an object (segment) of the sensor data is recognized, the embodiment obtains information regarding the recognized object (segment) from the "recognition information database," element 424, and then the embodiment augments the time-tagged LOS-marked sensor data signals 418 with the information regarding the recognized object (segment) by using the "central data augmenting system" 426, before sending the sensor data back to the display center.

In this embodiment of the present invention, users in the display centers 406 may provide the system with different input requests such as: choosing a particular data acquisition sensor from which to display sensor data by using the "sensor selector" 402; choosing a specific viewing angle to be used to orient a previously chosen data acquisition sensor by using the "angle-controller" 404; requesting access to information of interest related to the current events in the area being monitored by accessing the "current event database" 428; requesting access to information of interest related to prior events related to the current events in the area being monitored by accessing the "related-information database" 430; requesting to display on the display centers a graphical doodle overlay created by the "graphical doodle model generator," element 432, from a doodle drawn by the user on an electronic writing device connected to his/her display center; and requesting to change the user's display center to game mode by using the "game mode system," element 434, which allows the user to continue a sport event being monitored as the user would like to see the sport event play out until the user decides to switch back the display device to display the live action captured by the data acquisition sensors.

The "central data augmenting system" 426 receives the different input requests petitioned by a user from the "recognition information database" 424, the "current event database" 428, and the "related-information database" 430, and then the "central data augmenting system" 426 combines all these inputs with the time-tagged LOS-marked sensor data signals 418 in order to render time-tagged visual representation overlays of the spatially-registered geometric models of objects (segments) present in the sensor data. In addition the "central data augmenting system" 426 receives the input request petitioned by a user from the "graphical doodle model generator" 432 and combines the graphical doodle model with the time-tagged LOS-marked sensor data signals 418 in order to render time-tagged graphical doodle overlays. Then, the "central data augmenting system" 426 uses a "compositor" to compose a "time-tagged visual representation overlay," signal 436, from the time-tagged visual representation overlays of the spatially-registered geometric models of objects and the doodle. Next, the embodiment of the present invention sends the "time-tagged visual representation overlay," signal 436, to be displayed on the plurality of display centers 406.

Furthermore, in the cases when the event on the area being monitored is a sport game and the "central data augmenting system" 426 receives an input request petitioned by a user from the "game mode system" 434, the "central data augmenting system" 426 uses the "spatially-registered geometric models" of actors or objects present in the sensor data along with the information stored in the "current-event database" 428 (reflecting the state of the current sport game) to generate the initial states for a game engine. Then the "central data augmenting system" 426 sends this initial states to a game engine at the display center of the user, and further allows the user to switch the display device in the display center to game mode, until the user requests to switch back to the live action being captured by the data acquisition sensors.

The detailed embodiments of the various features discussed previously will be presented below.

Figure 5:
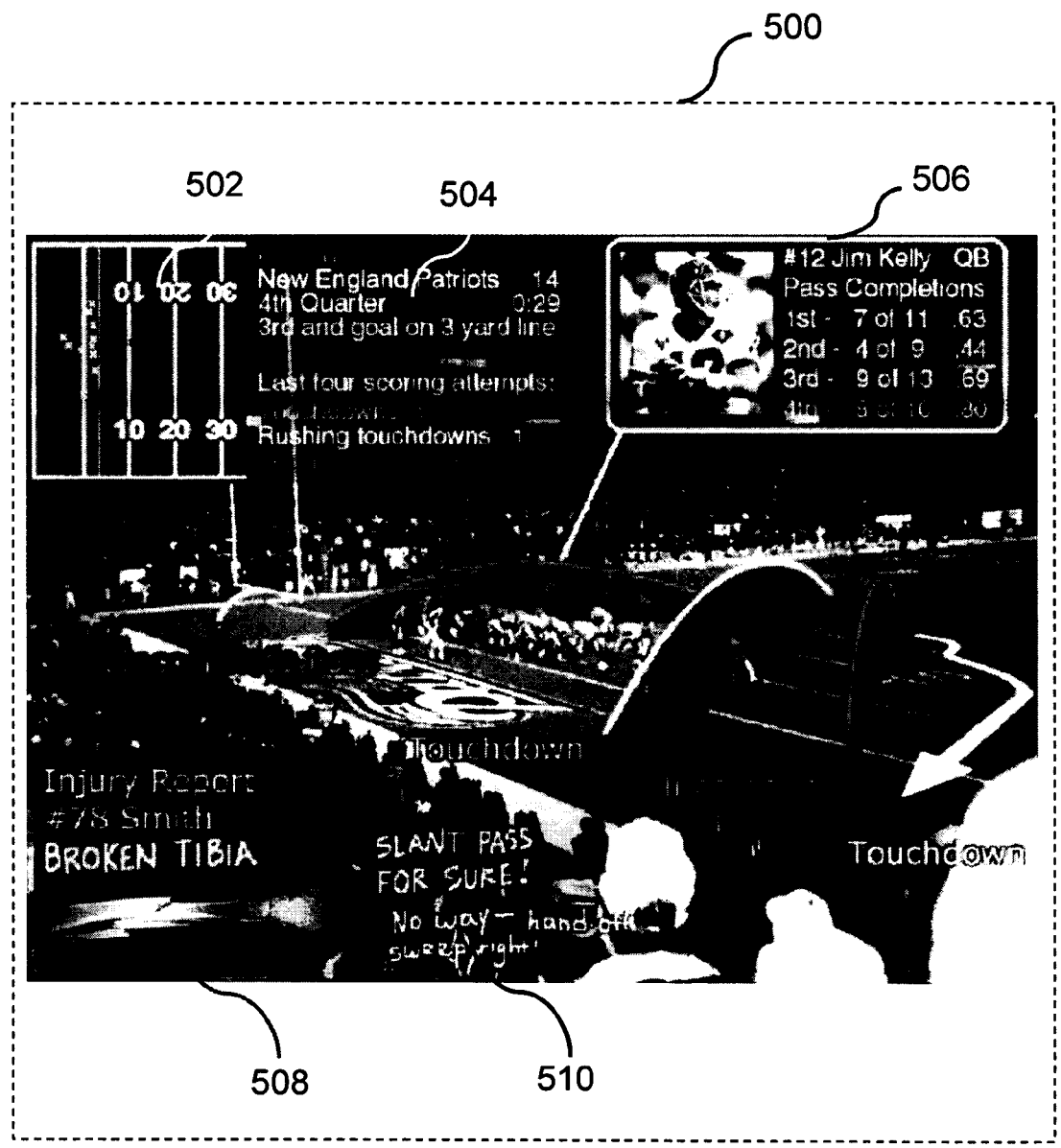
FIG. 5 is an illustration showing a potential schematic representation of a display image with overlay graphics typical of the ones produced by the present invention, where sensor data related to an entertainment event is being augmented with user-inputted doodles and user-requested information and statistics.

An embodiment of the present invention is an interactive system and service for enhancing the enjoyment of sports entertainment in arena luxury boxes (display centers) through augmentation of closed-circuit video (sensor data) with statistics and other information, and through user-interaction with the community of other users of the system. This embodiment allows fans (users) to interact directly with the "sports info-sphere" and with other sports fans about the sports info-sphere. FIG. 5 illustrates a mockup display image 500 of a typical scene from a football game, with overlay graphics typical of the ones produced by an embodiment of the present invention, wherein the overlay graphics correspond to a "composited augmented reality audiovisual media stream" generated by the "compositor" module of the "central data augmenting system." The upper left corner of FIG. 5 illustrates an example of a "game mode system" display 502, where the user requests to switch the display device to display a video game mode which allows the user to continue the football game as the user would like to see the football game play out. Furthermore, in the display image 500, the sensor data related to the football game is further augmented with: user-requested information and statistics related to the current football game 504 which are stored in the "current-event database" of the invention; user-requested information related to an object of interest (player) 506 recognized by the "object recognition system", wherein the information is stored in the "recognition-information database" of the invention; user-requested information related to prior events which are related to the current football game 508 which are stored in the "related-information database" of the invention; and with user-inputted doodles 510.

Figure 6:
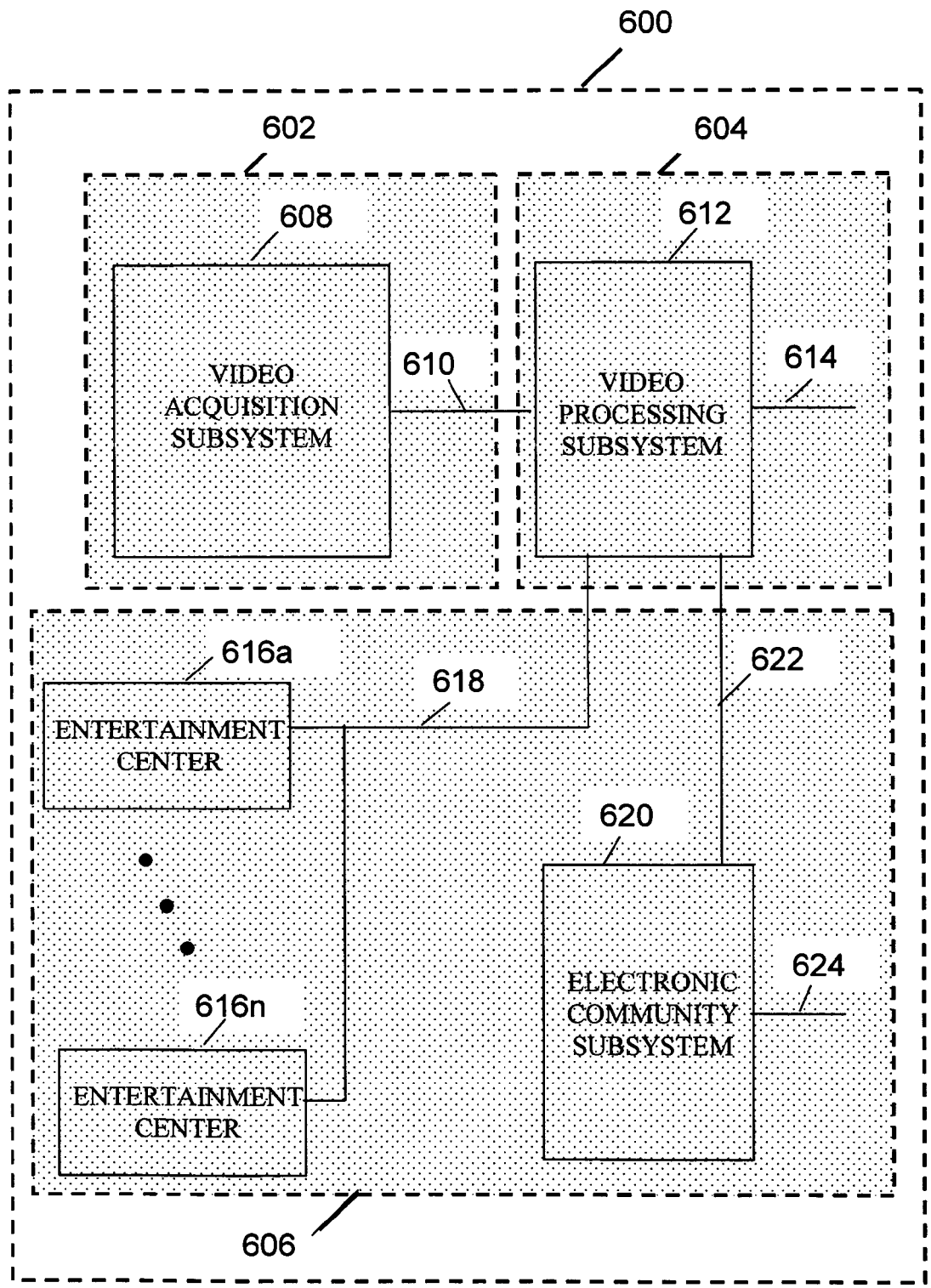
FIG. 6 is a block diagram depicting the operating modules/acts/means of a third embodiment of the present invention.

Another embodiment of the present invention, an interactive augmented reality entertainment system 600, is shown in FIG. 6, where the interactive augmented reality entertainment system 600 comprises three main portions, the "sensor data acquisition system" 602, the "central data augmenting system" 604, and the "plurality of display centers" 606, which will be described in greater detail below, where the element 602 corresponds to the previously described element 104 and 400, and element 606 corresponds to the previously described element 106 and 406. The "sensor data acquisition system" portion 602 of this embodiment contains elements 608 and 610, where element 608 is a video acquisition subsystem and element 610 is a capture network. The "central data augmenting system" portion 604 of this embodiment contains elements 612 and 614, where element 612 is a video processing subsystem and element 614 is a sports information database interface. The "plurality of display centers" portion 606 of this embodiment contains elements 616, 618, 620, 622, and 624, where elements 616a, . . . , 616n are a plurality of entertainment centers (display centers), element 618 is a content distribution network, element 620 is an electronic community subsystem, element 622 is an electronic community network, and element 624 is a connection to the public Internet. In this embodiment of the invention, the video acquisition subsystem 608 is connected to the video processing subsystem 612 by way of a capture network 610. Then, the video processing subsystem 612 connects to the plurality of entertainment centers 616*a*, ..., 616*n* (generally referred to as entertainment centers 616) by way of a content distribution network 618. In addition, the video processing subsystem 612 is also connected to the electronic community subsystem 620 by way of an electronic community network 622, and then the electronic community subsystem 620 is connected to the public Internet via the connection to the public Internet 624.

In a preferred embodiment of the invention, a non-limiting example of the capture network 610 is implemented using Fibre Channel [ANSI X3.230-1994] fiberoptic cable and compatible switches. However, this network can be made from any other communication media that provides an isochronous transfer mode or some other means of maintaining real-time quality-of-service levels and sufficient cable length capability (approx. 1 km). In another preferred embodiment of the invention, non-limiting examples of the content distribution network 618 and the electronic community network 622 are implemented using standard 100Base-T Ethernet cables and switches.

Figure 7:
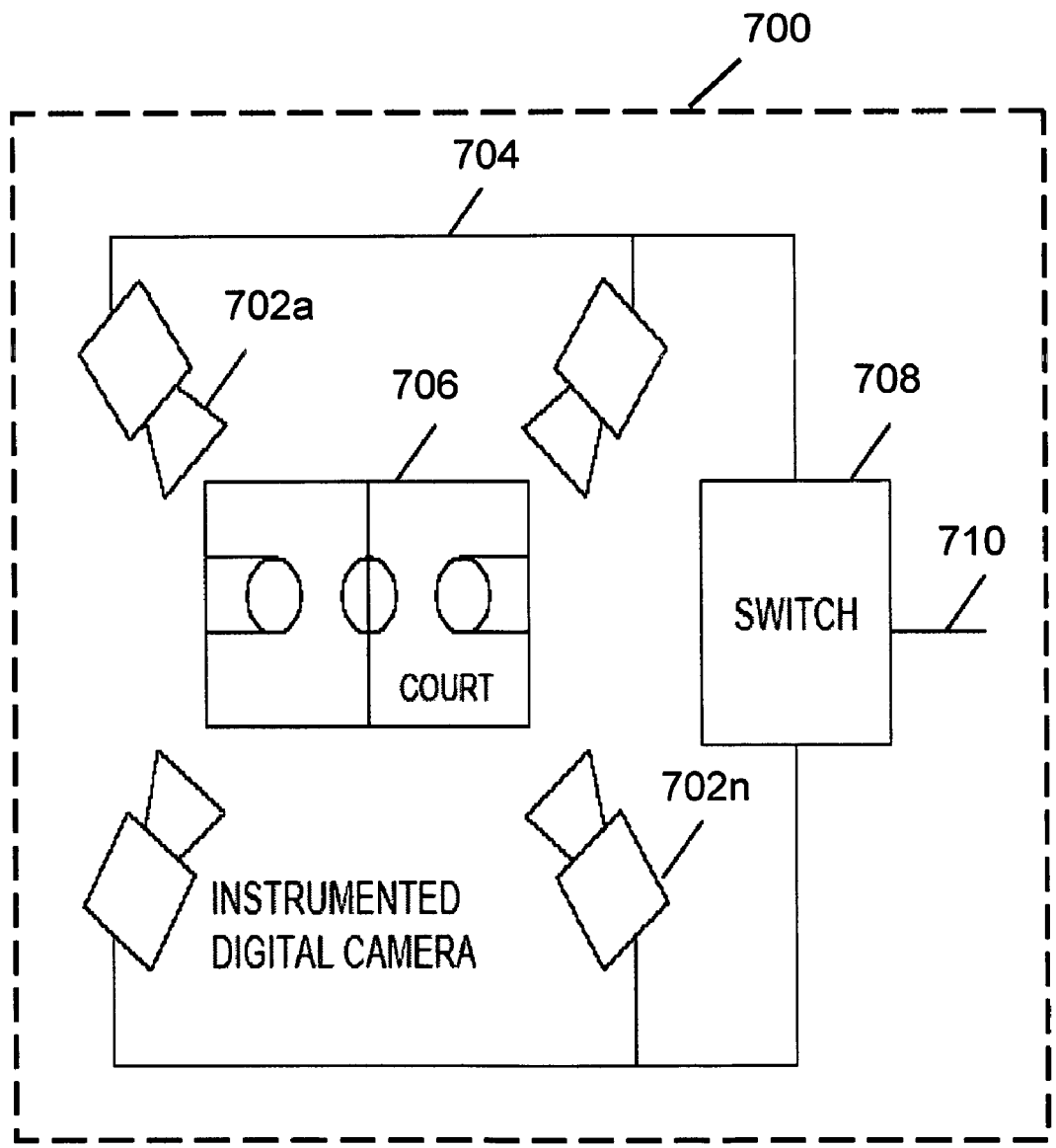
FIG. 7 is a sketch illustrating a video acquisition subsystem of an embodiment of the present invention.

FIG. 7 illustrates an embodiment of the video acquisition subsystem 700, where element 700 corresponds to the previously described element 608. In this embodiment, the video acquisition subsystem 700 consists of a plurality of instrumented digital cameras 702*a*-702*n* (generally referred to as instrumented digital cameras 702) distributed around a stage or area, where for this embodiment the area may be a court 706 or other athletic or artistic facility. Each instrumented digital camera 706 is precisely surveyed at the time it is installed to determine its precise location relative to a fixed Cartesian reference within the stadium or arena. Then, each instrumented digital camera 702 is pointed at the court 706 such that all areas of the court are within the camera's field-of-view at the widest zoom. Each instrumented digital camera 702 connects to a plurality of switches 708, as needed to handle the bandwidth requirements of the plurality of instrumented digital cameras. It is possible that another embodiment may do without the switch 708, and route the fiber optic cables directly to the video processing subsystem 612 via the capture network 710, where element 710 corresponds to the previously described element 610.

Figure 8:
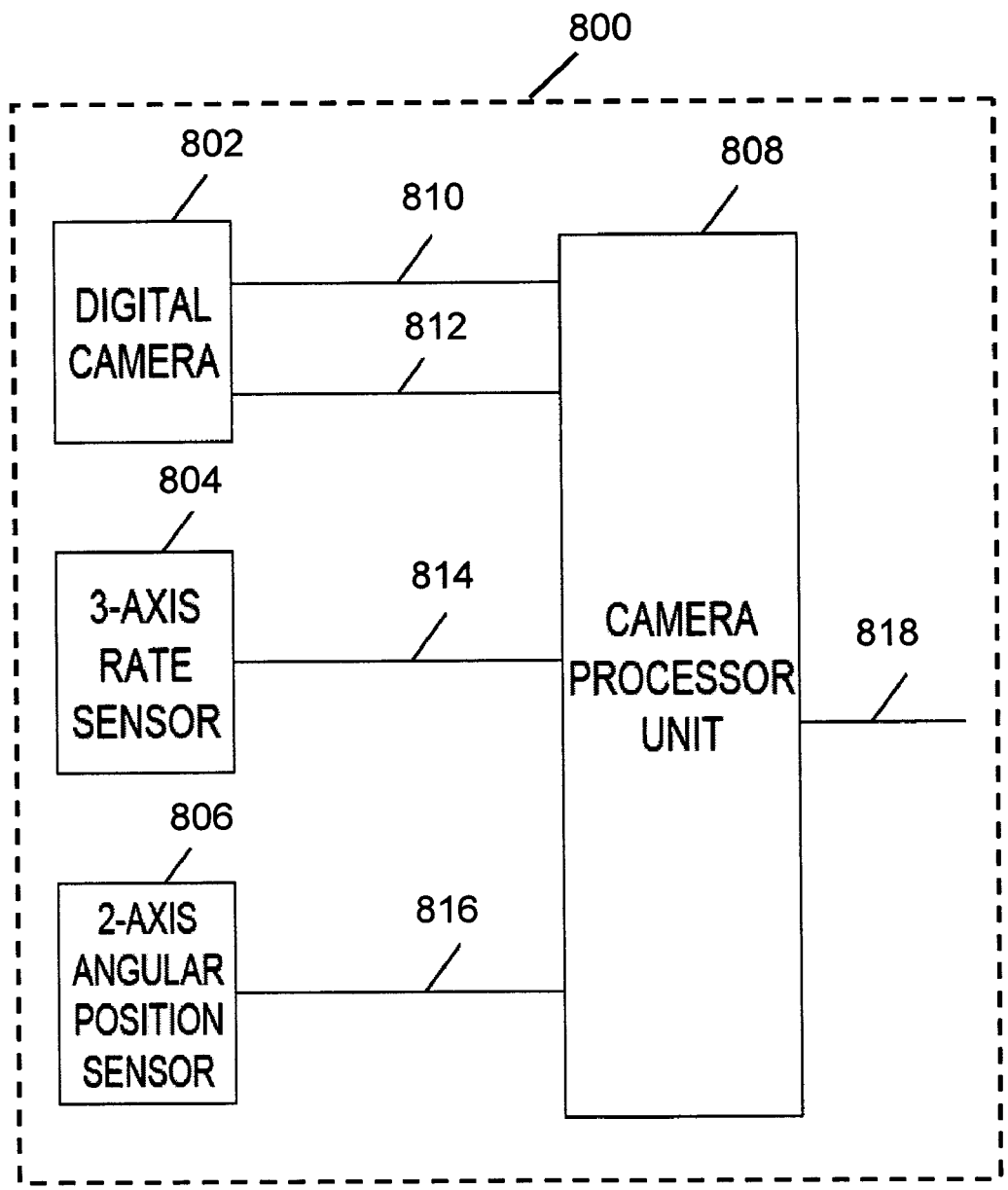
FIG. 8 is a block diagram depicting the operating modules/acts/means of an instrumented digital camera of an embodiment of the present invention.

FIG. 8 illustrates an embodiment of an instrumented digital camera 800, where element 800 corresponds to the previously described element 702. The instrumented digital camera 800 in this embodiment consists of a digital camera 802 mounted on a tripod or other rigid platform (not shown) on which a three-axis rate sensor 804 and a two-axis angular position sensor 806 are also affixed. The two-axis angular position sensor 806 is attached to the platform so that it measures the pitch and yaw angle of the digital camera 802 line-of-sight (LOS). Furthermore, the three-axis rate sensor 804 is attached to the platform so that it measures the roll rate, pitch rate, and yaw rate of the digital camera 802. In this embodiment, the digital camera 802 is connected to a camera processor unit 808 by a digital video cable 810 and a camera sync cable 812. The three-axis rate sensor 804 is connected to the camera processor unit 808 by the rate sensor cable 814, and the two-axis angular position sensor 806 is connected to the camera processor unit 808 by the position sensor cable 816. Then, the camera processor unit 808 connects to the capture network 818, where the capture network term 818 corresponds to the previously described terms 610 and 710.

In a preferred embodiment of the invention, a non-limiting example of the instrumented digital camera 800 is implemented using a professional-grade digital camera with genlock capability (i.e., capability of slaving its video syncs to an external reference), such as the Panasonic AJHDC20A. Also in another embodiment, a non-limiting example of the two-axis angular position sensor 806 is implemented using two precision resolvers (with excitation and high-resolution resolver-to-digital conversion electronics) or a shaft-encoder. In still another embodiment, a non-limiting example of the three-axis rate sensor 804 is a low-drift digital sensor, such as three RD2200 single-axis FOGs (fiber-optic gyros) from KVH Industries of Middletown, R.I. However, many other types of digital cameras 802, three-axis rate sensors 804, and two-axis angular position sensors 806 may be used to implement the present invention.

Figure 9:
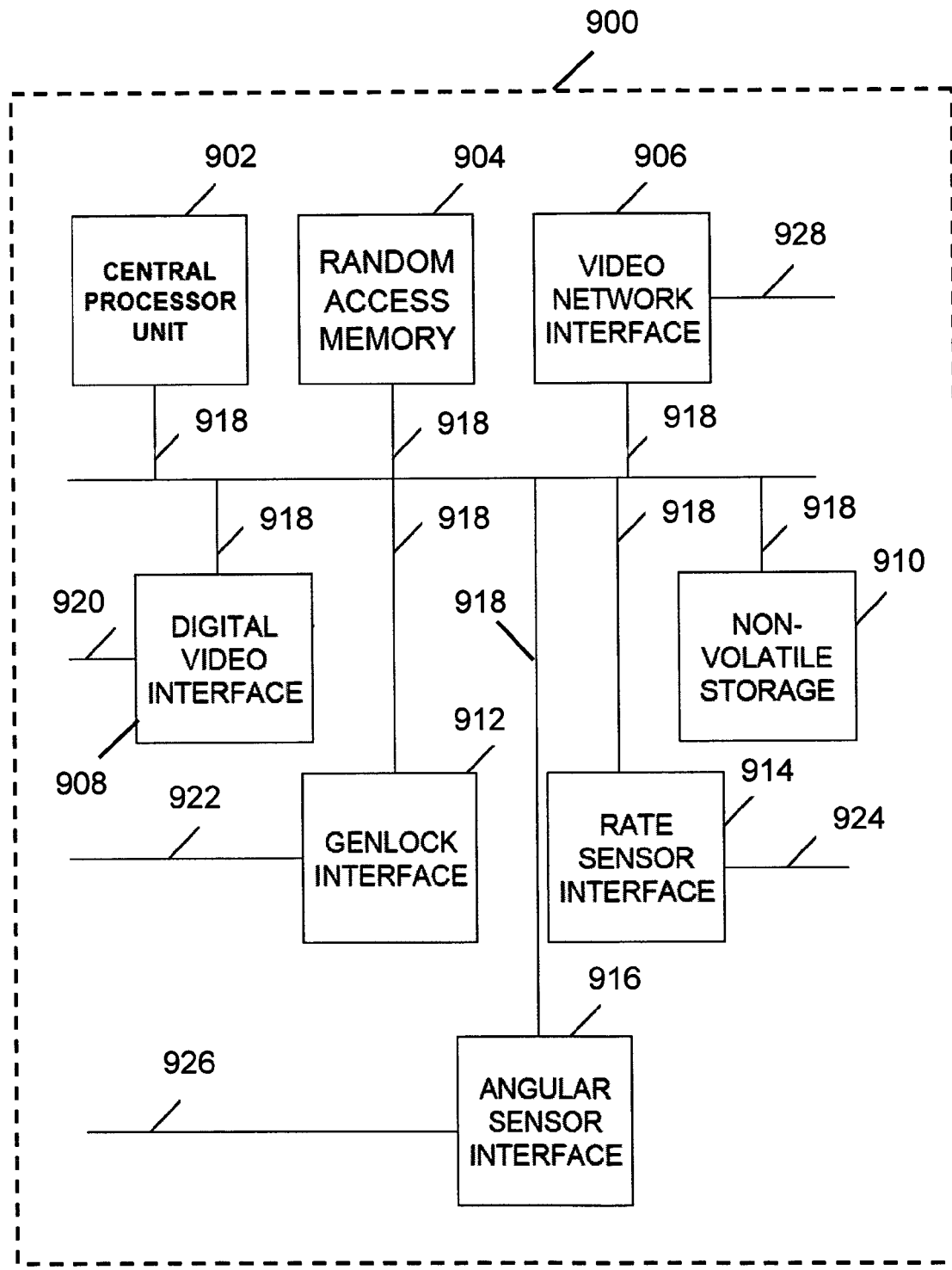
FIG. 9 is a block diagram depicting the operating modules/acts/means of a camera processor unit of an embodiment of the present invention.

FIG. 9 illustrates an embodiment of a camera processor unit 900, where the term 900 corresponds to the previously described term 808. In this embodiment, the camera processor unit 900 consists of a central processor unit 902, a random access memory 904, a video network interface 906, a digital video interface 908, a non-volatile storage 910, a genlock interface 912, a rate sensor interface 914, and an angular sensor interface 916. All these components (902, 904, 906, 908, 910, 912, 914, and 916) communicate using a camera processor unit bus 918. In this embodiment of the invention, the digital video interface 908 connects to the digital camera 802 via the digital video cable 920, where element 920 corresponds to the previously described element 810. Next, the genlock interface 912 connects to the digital camera 802 via the camera sync cable 922, where element 922 corresponds to the previously described element 812. The rate sensor interface 914 connects to the three-axis rate sensor 804 via the rate sensor cable 924, where element 924 corresponds to the previously described element 814. Then, the angular sensor interface 916 connects to the two-axis angular position sensor 806 via the position sensor cable 926, where element 926 corresponds to the previously described element 816. Once the digital images have been processed by the camera processor unit 900, the processed images are sent out of the video network interface 906 via the capture network 928, where element 928 corresponds to the previously described element 610, 710, and 818.

In another embodiment, a non-limiting example of the camera processor unit 900 is implemented in a personal computer (PC) chassis with a PCI 32 and PCI 64 slots. A non-limiting example of the central processor unit 902 is a high-end (possibly dual) Pentium 4 running at least at 2 GHz or better, the random access memory 904 is at least 1 GB or better of SDRAM on the chassis motherboard (although more memory is generally preferable for this system), and a non-limiting example of the non-volatile storage 910 is at least a 40 GB hard disk on a fast-wide SCSI bus, where once again, more non-volatile storage is always preferable for this system. Also in a further embodiment, a non-limiting example of the digital video interface 908 is selected such that it is compatible with the digital video outputs of the digital camera 802 being used, such as a GG-161 PCI-64 Bus-Compatible HD-SDI Frame Memory Board from Astrodesign, Inc. of Burbank, Calif. Also in another embodiment, a non-limiting example of the angular sensor interface 916 is selected such that, the angular sensor interface 916 is compatible with the three-axis rate sensor 804, such as 9600 baud RS-232C for the KVH RD2200. Also in another embodiment, a non-limiting example of the video network interface 906 is a Fibre Channel PCI host bus adapter, such as the LightPulse LP9002L, available from iSCSI HBA, Inc. of Golden, Colo.

Figure 10:
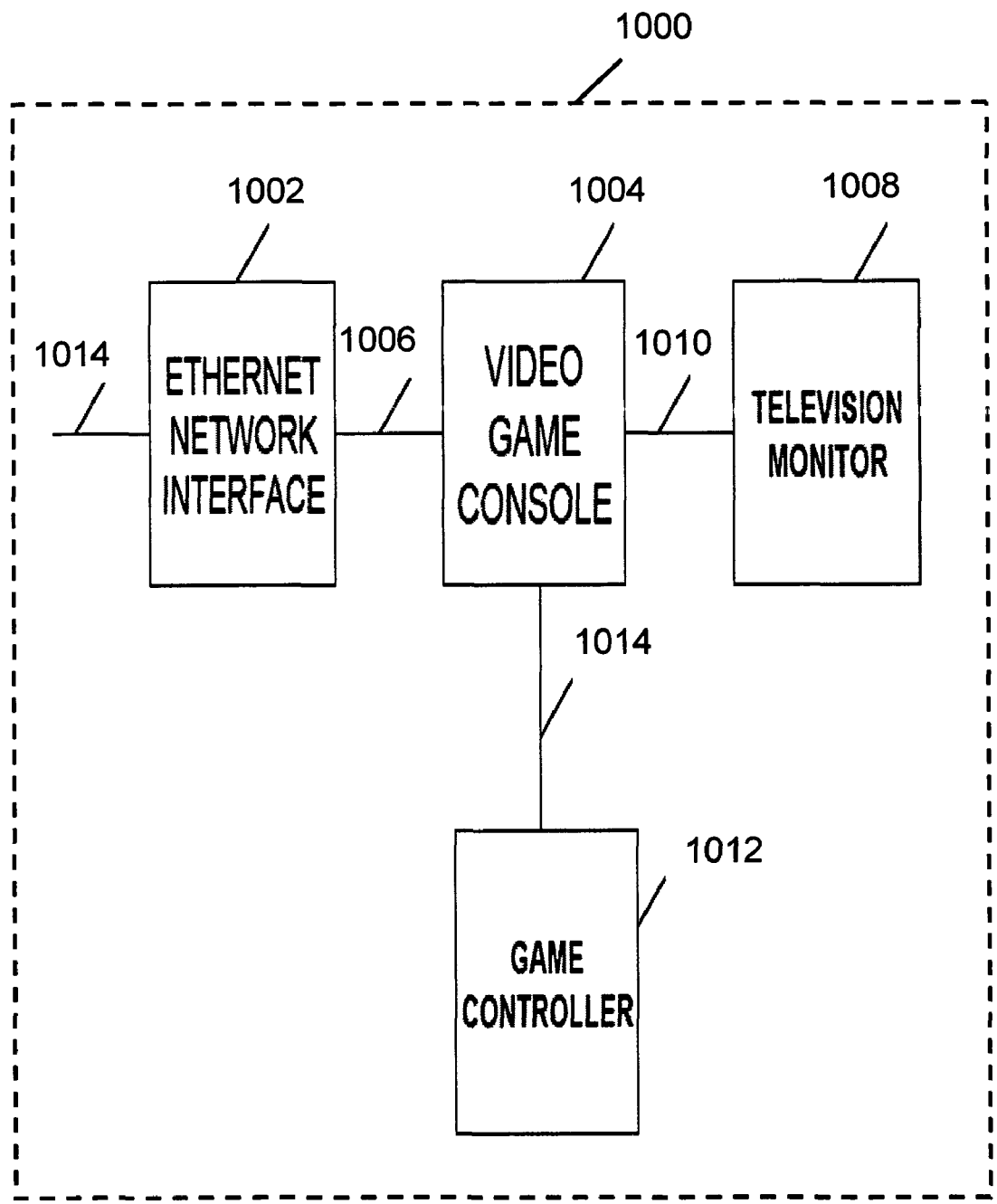
FIG. 10 is a block diagram depicting the operating modules/acts/means of an entertainment center (display center) of an embodiment of the present invention.

FIG. 10 illustrates an embodiment of a display center or entertainment center 1000, where element 1000 corresponds to the previously described element 616. In an embodiment of the present invention, the entertainment center 1000 consists of an Ethernet network interface 1002 that connects to a video game console 1004 by a broadband cable 1006. Furthermore, the video game console 1004 connects to a television monitor 1008 using an audiovisual cable 1010, and also connects to a game controller 1012 via a game controller cable 1014. In a preferred embodiment, a non-limiting example of the video game console 1004 is an X-Box made by Microsoft of Redmond, Wash., where the Ethernet network interface 1002 is built in, thus resulting in not needing a broadband cable 1006 to connect the video game console to an external Ethernet network interface. In addition, the X-Box comes with its own game controller 1012 and game controller cable 1014. Also in a preferred embodiment, a non-limiting example of the television monitor 1008 is any quality television, such as the Sony Wega.

Figure 11:
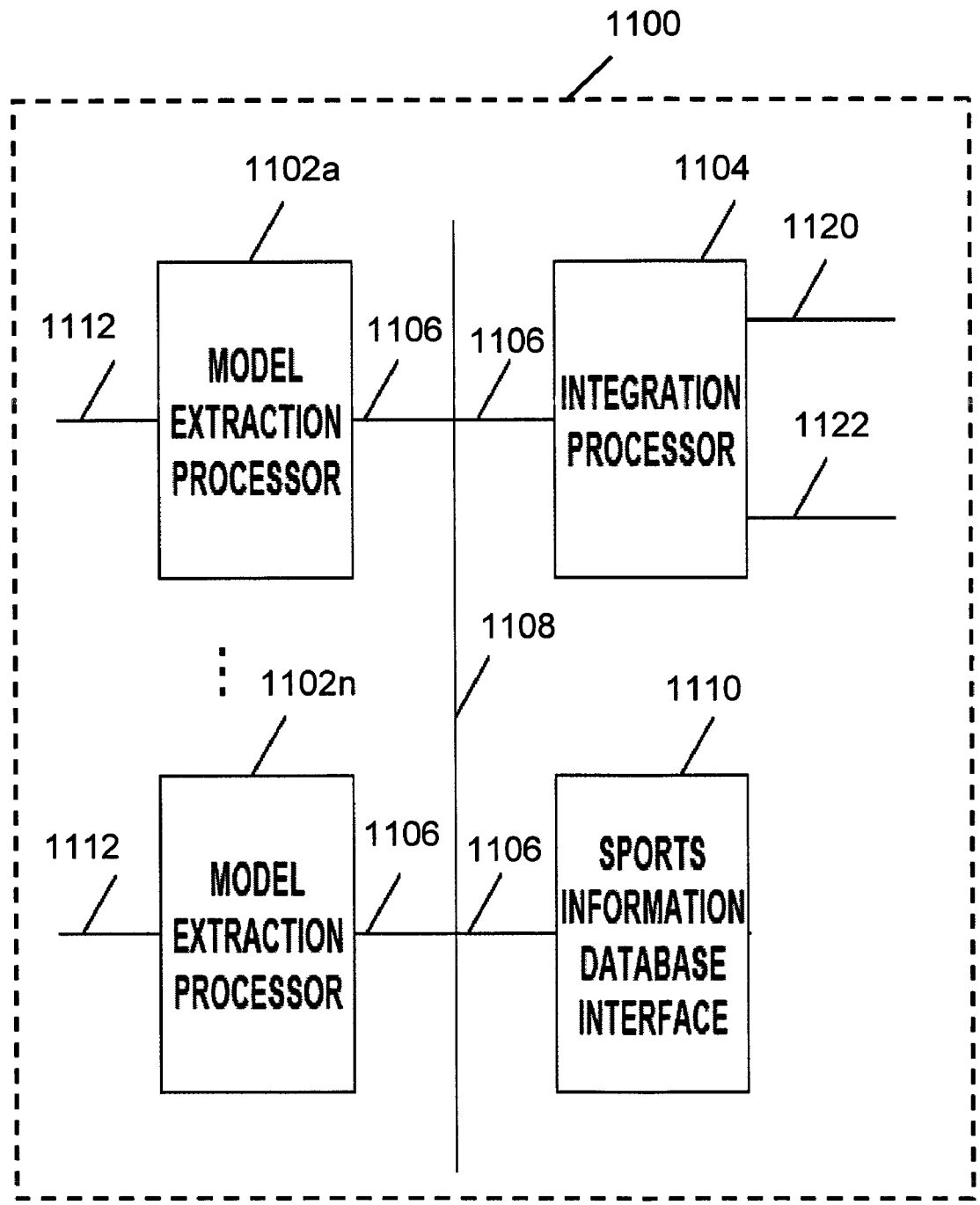
FIG. 11 is a block diagram depicting the operating modules/acts/means of a video processing subsystem of an embodiment of the present invention.

FIG. 11 illustrates an embodiment of a video processing subsystem 1100, where element 1100 corresponds to the previously described element 612. In an embodiment of the present invention, the video processing subsystem 1100 consists of a plurality of model extraction processors 1102a, ..., 1102n (generally referred to as model extraction processors 1102) connected to an integration processor 1104 by way of bus interfaces 1106 to a video processor system bus 1108. In addition, a sports information database interface 1110 connects with the video processor system bus 1108 by way of a bus interface 1106. Furthermore, the sports information database interface 1110 also connects with the model extraction processors 1102 via the bus interface 1106, while the model extraction processors 1102 receive their inputs from the video acquisition subsystem 608 via the capture network 1112, where element 1112 corresponds to the previously described element 610, 710, 818, and 928.

Figure 12:
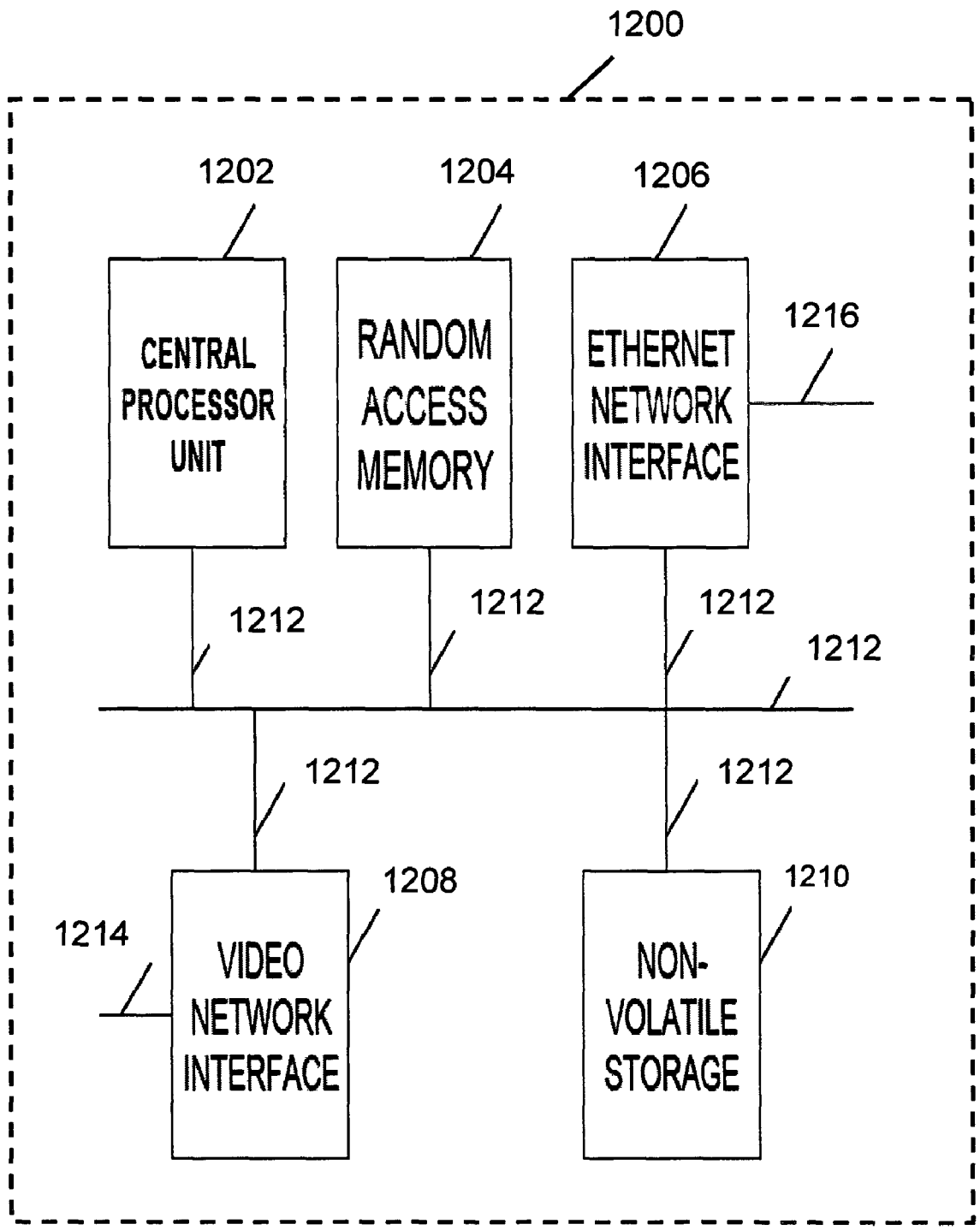
FIG. 12 is a block diagram depicting the operating modules/acts/means of a model extraction processor of an embodiment of the present invention.

FIG. 12 illustrates an embodiment of a model extraction processor 1200, where element 1200 corresponds to the previously described element 1102. In an embodiment of the present invention, the model extraction processor 1200 consists of a central processor unit 1202, a random access memory 1204, an Ethernet network interface 1206, video network interface 1208, and a non-volatile storage 1210 all interconnected with each other through a system bus 1212. The video network interface 1208 also receives inputs from the video acquisition subsystem 608 via the capture network 1214, where element 1214 corresponds to the previously described elements 610, 710, 818, 928, and 1112. Furthermore, the Ethernet network interface 1206 communicates with the integration processor 1104 and the sports information database interface 1110 via the bus interface 1216, where element 1216 corresponds to the previously described element 1106.

In another embodiment, a non-limiting example of a model extraction processor 1200 is implemented in a personal computer (PC) chassis with PCI 32 and PCI 64 slots, the central processor unit 1102 is a high-end (possibly dual) Pentium 4 running at least at 2 GHz or better, the random access memory 1204 is at least 1 GB or higher of SDRAM on the chassis motherboard (although more random access memory is generally preferable), and a non-limiting example of the non-volatile storage 1210 is at least a 40 GB or higher hard disk on a fast-wide SCSI bus, where once again more von-volatile storage is always preferable. Also in a further embodiment, a non-limiting example of the Ethernet network interface 1206 is a standard 100-Base-T network interface card, available from several vendors. Also in yet another embodiment, a non-limiting example of the video network interface 1208 is a Fibre Channel PCI host bus adapter, such as the LightPulse LP9002L, available from iSCSI HBA, Inc. of Golden, Colo.

Figure 13:
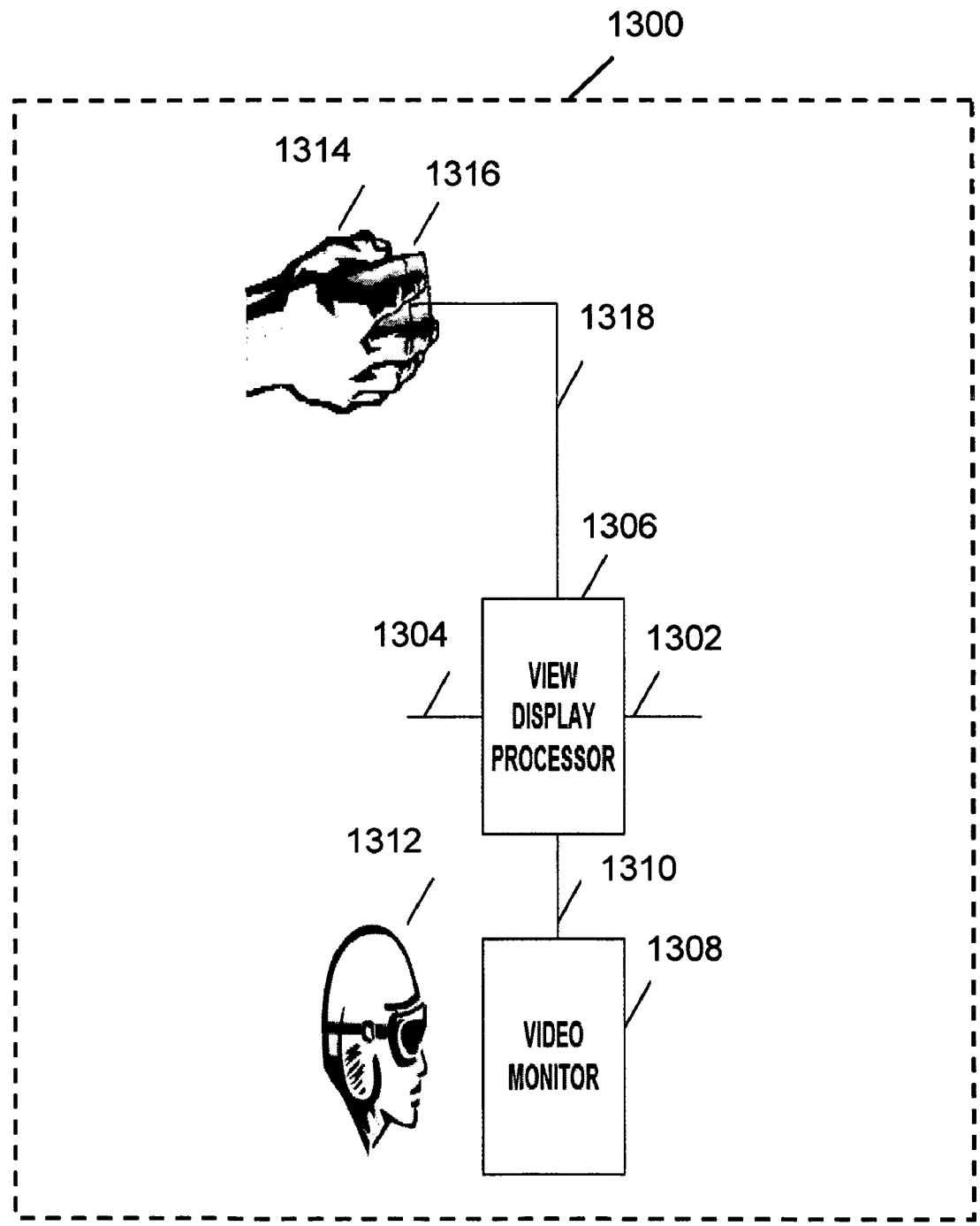
FIG. 13 is a block diagram depicting the operating modules/acts/means of a manual model extraction processor of an embodiment of the present invention.

FIG. 13 illustrates an alternate embodiment of a model extraction processor 1300, where element 1300 corresponds to the previously described element 1102 and 1200. In this alternate embodiment of the present invention, suitable for an initial system roll-out, player geometry is limited to a 3D bounding box and technicians manually track the players in the video, thus creating a manual model extraction processor 1300. In this embodiment, the alternate implementation of the model extraction processor 1300 consists of a view display processor 1302 connected to the capture network 1304 and the bus interface 1306, where elements 1304 and 1306 corresponds to the previously described elements 610, 710, 818, 928, 1112, and 1214 for element 1304, and 1106 and 1216 for element 1306. In addition, the model extraction processor 1300 contains a view display processor 1306 connected to a video monitor 1308 via a video monitor cable 1310. In this embodiment, a tracking technician 1312 views the video monitor 1308, and uses his or her hand 1314 to operate a mouse 1316. The mouse 1316 connects to the view display processor 1302 via a mouse cable 1318.

Figure 14:
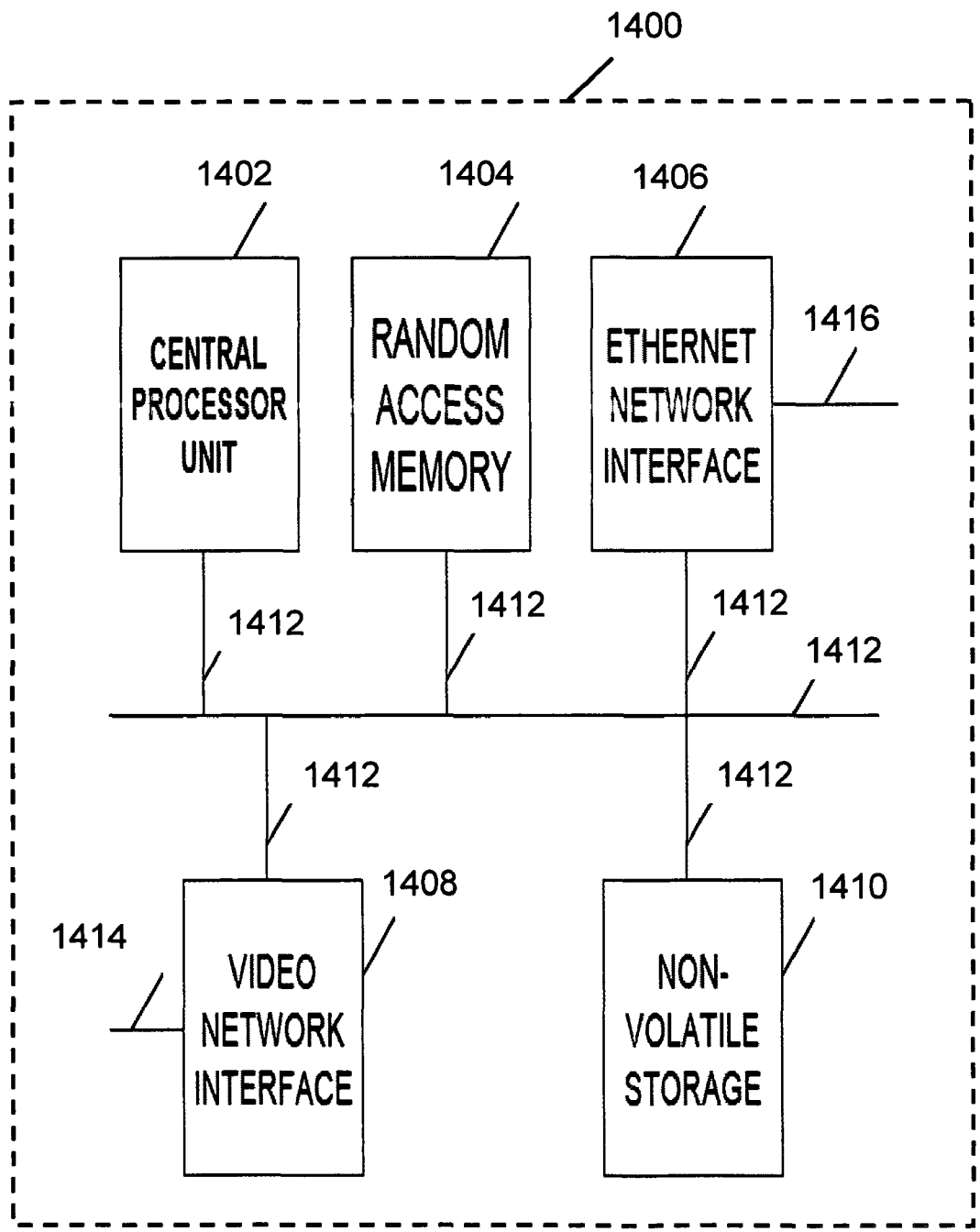
FIG. 14 is a block diagram depicting the operating modules/acts/means of a view display processor of an embodiment of the present invention.

FIG. 14 illustrates an embodiment of a view display processor 1400, where element 1400 corresponds to the previously described element 1306. In this embodiment, the view display processor 1400 is a commodity PC, similar in structure to the implementation of the embodiment of the model extraction processor 1200 shown in FIG. 12. As stated before and repeated here for clarity, in this embodiment of the present invention, the view display processor 1400 consists of a central processor unit 1402, a random access memory 1404, an Ethernet network interface 1406, video network interface 1408, and a non-volatile storage 1410 all interconnected with each other through a system bus 1412. The video network interface 1408 also receives inputs from the video acquisition subsystem 608 via the capture network 1414, where element 1414 corresponds to the previously described elements 610, 710, 818, 928, 1112, 1214, and 1304. Furthermore, the Ethernet network interface 1406 communicates with the integration processor 1104 and the sports information database interface 1110 via the bus interface 1416, where element 1416 corresponds to the previously described elements 1106, 1216, and 1306.

Figure 15:
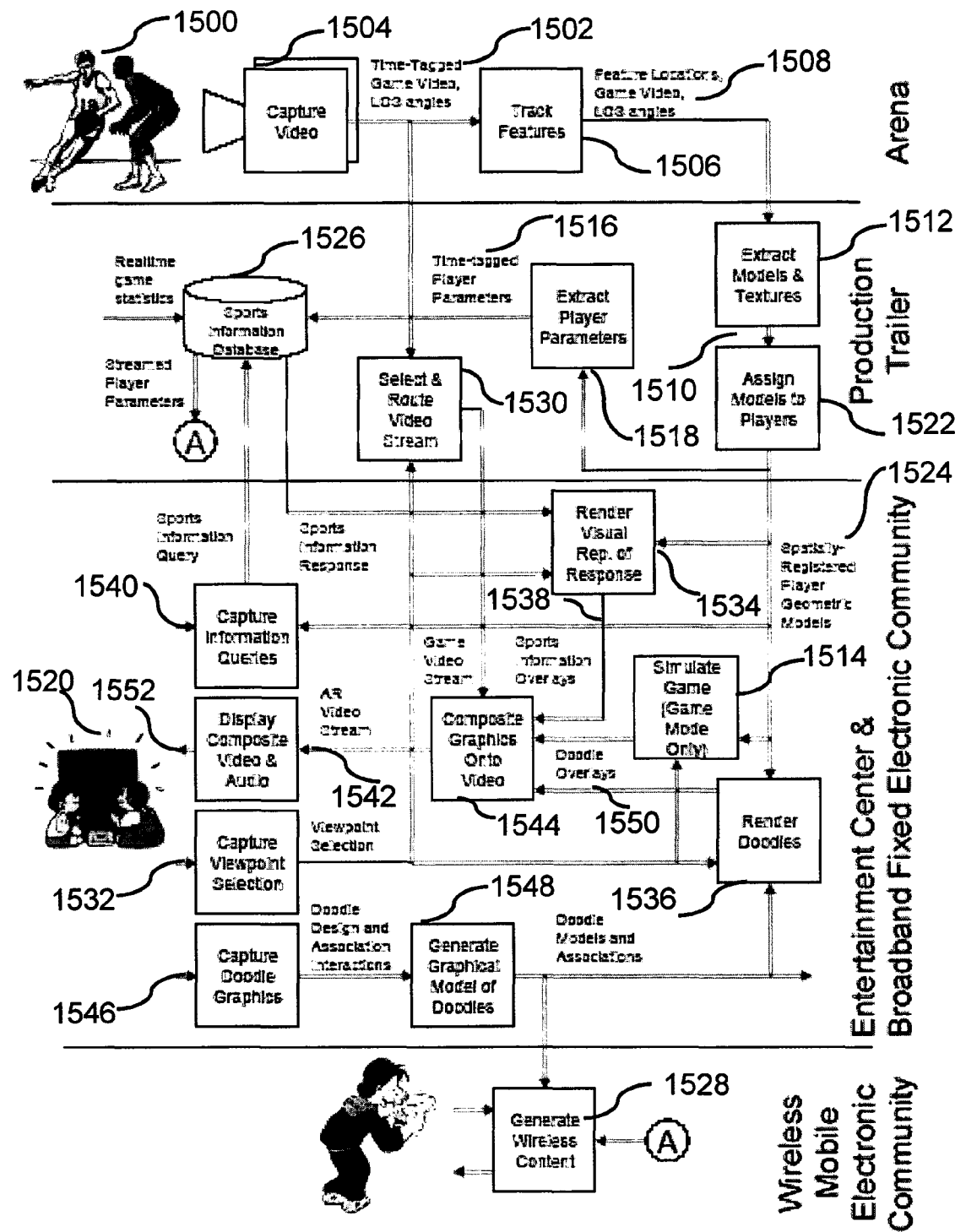
FIG. 15 is a detailed block diagram depicting the operating modules/acts/means of a fourth embodiment of the present invention.

In yet another embodiment of the present invention illustrated in FIG. 15, the "area being monitored" corresponds to a "sports arena" or a theater for the performing arts; the "data acquisition sensors" 104 correspond to "video cameras" 1504; the "sensor data" corresponds to "video"; the "display centers" 106 and 412 correspond to luxury boxes in a sports arena or "entertainment centers" 1520; the "users of the present invention" correspond to "viewers"; the "activity performed at the area being monitored" corresponds to artistic or "sporting events"; the "actors performing an activity" correspond to "players" 1500; the "input" for receiving input from a user 108 corresponds to the "capture information queries" 1540 subsystem; the "sensor selector" (110, 416) corresponds to the "select and route video stream" subsystem 1530; the "angle-controller" 404 corresponds to the "capture viewpoint selection" subsystem 1532; the "central data augmenting" system 426 contains the "compositor" subsystem, the "visual-renderer" 1534, and the "doodle-renderer" 1536; the "object recognition" system 420 contains the "tracker" 1506, the "model extractor" subsystem 1512, the "assign models to players" subsystem 1522, and the "extract player parameters" subsystem 1518; the "current-event database" 428 and the "related-information database" 430 are both contained in the "sports information database" 1526; the "wireless device display centers" 412 and the "networked device display centers" 410 correspond to the "electronic communities" 1528; the "graphical doodle model generator" 432 corresponds to the "generate graphical models of doodles" subsystem 1548; and the "game mode system" 434 corresponds to the "simulate game" subsystem 1514.

The preferred embodiment illustrated in FIG. 15 allows viewers of a video of sporting or artistic events to interact with the likenesses of the players or actors in world coordinate space. In this preferred embodiment, video of the players 1500 is captured and time-tagged, along with the LOS orientation angles estimate 1502 (computed from the measured angles and angular rates) of a plurality of video cameras 1504 used to capture the video, where element 1504 correspond to the previously described elements 104, 400, 602, 702, and 800. In this embodiment, the video cameras 1504 are allowed to slew to follow the action, thereby providing a more efficient use of each video camera field-of-view (FOV). Time tags across video cameras are kept consistent by synchronization of the clocks at each video camera processor. This synchronization is accomplished by execution of a network time synchronization protocol known by those of ordinary skill in the art, where a non-limiting example is the Network Time Protocol (NTP) [RFC1305]. The NTP assures synchronization of the clocks to within milliseconds. The integration processor 1104, previously described in FIG. 11, serves as the master time reference in this embodiment.

Features from segments of interest in the sensor data are detected and tracked in each video stream by using a "tracker" 1506, where a manually operated system, similar to the one shown in FIG. 13, may be needed to establish the initial features to be tracked. Next, "spatially-registered geometric models" 1510 are extracted from the "3D feature location data" 1508, and textures are extracted from the video streams based on the spatially-registered geometric model locations in the scene, where element 1510 corresponds to the previously discussed element 422. The spatially-registered geometric models 1510 are generated by a "model-extractor" subsystem 1512. In general, the complexity of these models can range from a single point to a bounding parallelepiped to a triangle mesh. In this embodiment, however, the spatially-registered geometric model is simply the box bounded by the feature points and the floor or ground. In an alternative embodiment, a spatially-registered geometric model is generated by the "tracker" 1506. In addition, textures are also extracted by the "model-extractor" subsystem 1512 from the video for use with the spatially-registered geometric models in a "simulate game" subsystem 1514 which will be discussed in detail below, where element 1514 corresponds to the previously discussed element 434. The spatially-registered geometric models for a player and ball/puck are time tagged, based on the synchronized frames from which they were extracted, then "time-tagged parameters" 1516 describing the spatially-registered geometric models are extracted by the "extract player parameters" subsystem 1518 and the "time-tagged parameters" 1516 are distributed to each of the "entertainment centers" 1520 (display centers), where element 1520 corresponds to the previously discussed elements 106, 406, 616, and 1000.

The spatially-registered geometric models 1510 are associated with the players by the "assign models to players" subsystem 1522 resulting in "spatially registered player geometric models" 1524. Manual assistance may be needed to initiate and correct this association from time-to-time, however it will normally be maintained through the 3D tracking performed by the "tracker" 1506. In other embodiments, face recognition is integrated into the "object recognition system" 420 previously discussed with regard to FIG. 4 to further automate the player association function, as described in "Tracking Multiple Objects in the Presence of Articulated and Occluded Motion," *Proceedings of the Workshop on Human Motion*, Austin, Tex. 7-8 Dec. 2000, pp. 88-95 by S. L. Dockstader and A. M. Tekalp. However, Dockstader and Tekalp's work would need to be extended, because S. L. Dockstader and A. M. Tekalp used fixed-FOV and fixed-LOS cameras. Although multiple other algorithms may be pursued to integrate face recognition into the present invention, as known by any artisan skilled in the art.

In yet another embodiment of the invention, once tracked data has been associated with the players, the time sequences of player activity are stored in a current sports information database 1526 (current information database), where the term 1526 corresponds to the previously described term 428. This current sports information data 1526 is used to recreate the action for the fans in the entertainment center 1520 or out in the "electronic communities" 1528.

Meantime, while the fan (user) is in his or her luxury box enjoying the game, he or she can choose to view the game from any of the plurality of video cameras 1504 (data acquisition sensors) in the embodiment of the invention, by using the "select and route video stream" subsystem 1530 to select a video camera and by using the "capture viewpoint selection" subsystem 1532 to select a corresponding viewpoint. Then, when the fan makes a viewpoint selection via the subsystem 1532, the selected video stream is routed to his entertainment center 1520 using routing techniques known to those of ordinary skill in the art. In addition, the location and orientation data for this selected viewpoint are sent to all of the renderer subsystems, mainly the "visual-renderer" 1534 and the "doodle-renderer" 1536, for use in the projective transformations performed by the renderers 1534 and 1536. The "visual-renderer" 1534 receives the "spatially-registered player geometric models" 1524, the user-selected viewpoint from the "capture viewpoint selection" subsystem 1532, and the current sports information 1526 related to the player in the geometric models, and combines all these signals (1524, 1532, 1526) into a "sports information overlay" 1538 (time-tagged visual representation overlay).

Furthermore, the embodiment of the present invention allows a fan to compose and send a sports information query to the sports information database 1526 via the "capture information queries" 1540 subsystem, where the term 1540 corresponds to the previously discussed term 108. The request might be of the type: "How often did Kobe get his shot blocked by Tim Duncan when shooting a lay-up at this point in the game?" The "spatially-registered player geometric models" 1524 provide the information on where Kobe and Duncan are at the time. Assuming the current sports information database 1526 has statistics on this query, it sends those statistics to the entertainment center 1520, where a graphical representation is selected by the user for rendering to the display device in the entertainment center. In this embodiment, the graphical representation consists of a "composited augmented reality audiovisual media stream" 1542 generated by a "compositor" subsystem 1544 by combining the "sports information overlay" (time-tagged visual representation overlay) 1538 from the "visual-renderer" 1534 with the routed "time-tagged video frames" 1502 oriented at the viewpoint selected by the user. Therefore, the fan may be offered a choice of representations by the "compositor" subsystem 1544, where the fan can select from a plurality of "composited augmented reality audiovisual media streams" 1542 for the information.

In this preferred embodiment of the invention, the fan can also create a session of like-minded fans who want to "graphically chat" about the game. These fans give permission to send each other 3-D "graphical doodles" that can be either spatially-registered to the arena or relative to one of the players or the ball. The fan can compose a graphical doodle on his/her entertainment center by drawing doodles on an electronic writing device connected to a "capture doodle graphics" subsystem 1546 at his/her entertainment center. The graphical model of this doodle and its placement parameters (e.g., absolute or relative position and orientation data) are generated by a "generate graphical models of doodles" subsystem 1548, and then the graphical models of the doodles are sent to the other fans in the session via the "doodle renderer" 1536 and the "compositor" 1544. Using the viewpoint data, the placement parameters, and the spatially-registered player geometric models (if relative placement is selected), a "doodle overlay" 1550 is rendered by the "doodle renderer" 1536 on each entertainment center included in the session by passing this "doodle overlay" 1550 to the "compositor" 1544. The "compositor" 1544, in turn, generates a "composited augmented reality audiovisual media stream" 1542 by combining together the "doodle overlay" 1550, the "sports information overlay" 1538, and the routed "time-tagged video frames" 1502 oriented at the viewpoint selected by the user. Then, the "composited augmented reality audiovisual media stream" 1542 containing the "doodle overlay" 1550 is sent to the "display device" 1552 of the entertainment centers of the other fans in the session.

The "compositor" 1544 takes the time-tagged video, audio, and all time-tagged overlays and generates a single, composited augmented reality audiovisual media stream 1542. The input video stream will be buffered (stored) so that overlays and video can be correctly matched, and so the fan can roll back in time (in VCR fashion).

In a further embodiment of the present invention, there is an additional optional mode of operation. If the fan becomes displeased with the progress of the game, he or she can switch to "game mode" by using the "simulate game" subsystem 1514. In this mode, the spatially-registered player models 1524 and game state (score, time, etc.) are used as the initial states for a game engine. A game engine, such as but not limited to the ones used in EA Sports NBA Live 2003 [EA03] then allows the fan to continue with the game as he or she would like to see it play out, until he or she decides to switch back to live action.

In an embodiment of the invention, two electronic communities are supported but not limited to: the "Broadband Fixed" community with high-performance platforms, such as high-performance game consoles (e.g., Playstation 2, X-Box) or "gamer" PCs with advanced graphics cards and broadband (>2 Mbps) Internet access, and the "Wireless Mobile" community with game-enabled, Internet-capable wireless handheld devices. However, many other electronic communities may be supported by the embodiment of the invention.

In an embodiment, the Broadband Fixed electronic community has all the same capability to interact with the game video and the sports infosphere as the fans at the Entertainment Center in the luxury box in the arena. The required level of broadband service for this to work is currently available wirelessly in South Korea [Yang02], and there are indications that U.S. regional Bell operating companies may use fiber-to-the-home as a way to win the market share battle against digital cable modem providers [AP03, Berman03]. Fiber would provide five hundred times the bandwidth of digital cable modem.

In another embodiment, the Wireless Mobile electronic community consists of fans in transit to/from the arena, fans who otherwise can't get to the arena, and fans who are in the arena but who are not in the luxury boxes. These fans are armed with Internet-enabled "game phones" that include sufficient processing power to run the game engine and render 3-D graphics and are capable of executing Sun Microsystems' Java or Qualcomm's Binary Runtime Environment for Wireless (BREW) programs. Non-limiting examples of these devices currently or soon to be available are the Nokia N-Gage [N-Gage], the Sony Ericsson T606 [SE03a], and the Sony Ericsson T310 [SE03b]. Although very powerful for phones, these devices will not, in the near term, be able to handle the rendering workload required by the baseline Entertainment Center system. Services and client programs will therefore be specifically targeted to the computational capabilities of these platforms.

In a further embodiment, fans in the Wireless Mobile electronic community purchase online and download a Java or BREW program that provides them access into the wireless mobile community server at the arena. This server provides several interaction modes in which, data from the sports information database 1526, doodle models, and other information appropriate to the handheld platforms, can be delivered. Non-limiting examples of these modes include highlight clips, and rapid replay rendering.

In another embodiment of the invention, while the user is in "game mode" in the rapid replay mode, player location and activity parameters from the database are transmitted to the user's phone. The game engine in the phone recreates the play based on these activity parameters. While the experience is not identical to the video record, it conveys the substantial progress of the game in a way that can be handled by the resources of the phone. Using a cellphone as a basketball game platform has been demonstrated by Yao Ming Basketball by Sorrent using BREW and CDMA2000 1X-enabled cellphones as discussed in the press release "Yao Ming Basketball by Sorrent to be Distributed Exclusively via QUALCOMM's BREW Solution", Apr. 29, 2003, by QUALCOMM Incorporated.

Figure 16:
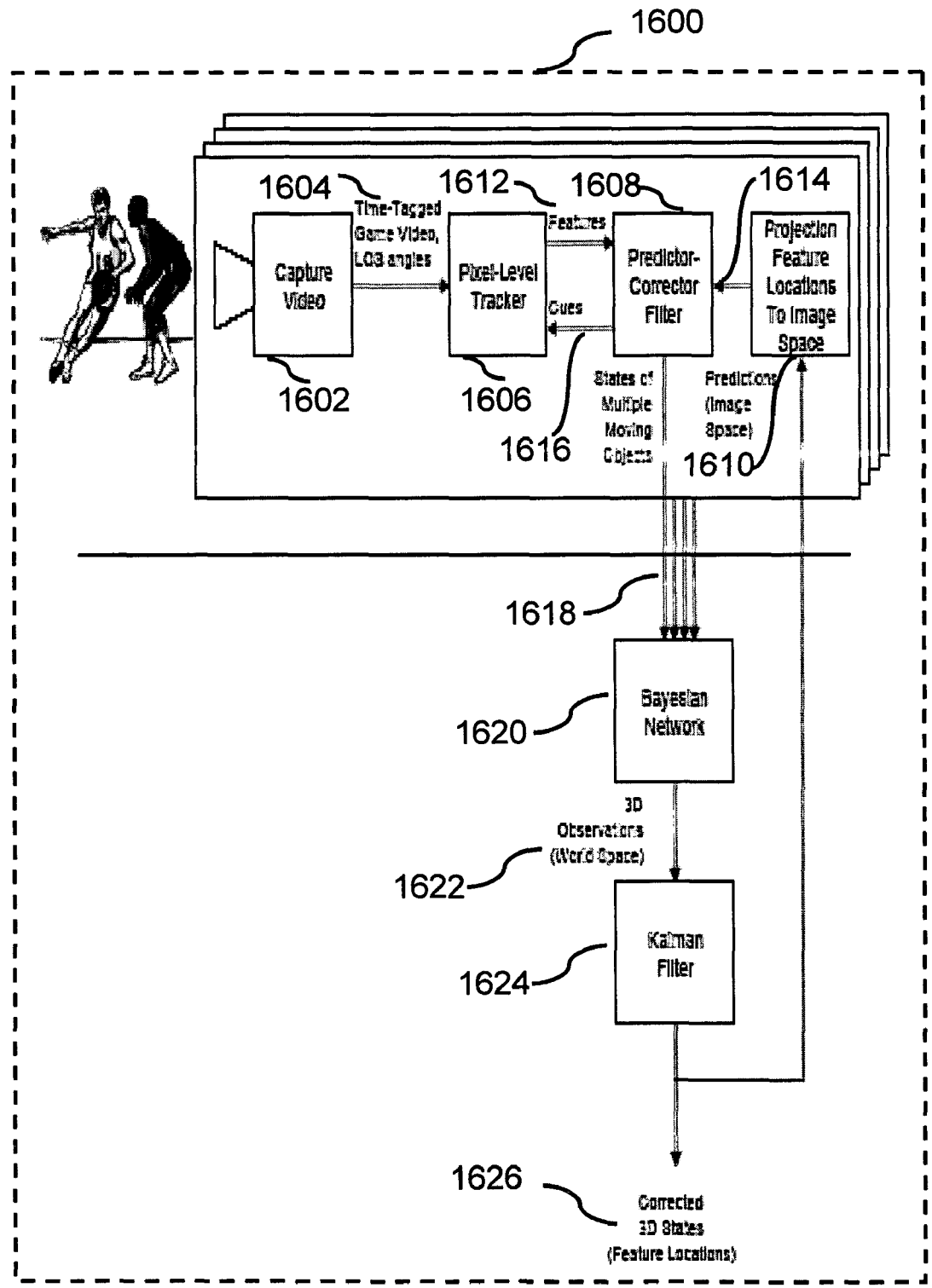
FIG. 16 is a detailed block diagram depicting the operating modules/acts/means of a state-based model-free tracking system of an embodiment of the present invention.

FIG. 16 shows a preferred embodiment for a state-based model-free tracking system 1600 corresponding to the "tracker" 1506, similar to the one demonstrated by S. L. Dockstader and A. M. Tekalp in "Multiple camera tracking of interacting and occluded human motion", *Proceedings of the IEEE*, October 2001, pp. 1441-55. In this embodiment, the data acquisition sensor corresponds to a video camera 1602 which outputs "time-tagged LOS-orientation-angle-tagged video" 1604, where the terms 1602 and 1604 correspond to the previously described terms 1504 and 1502, correspondingly. In the embodiment illustrated in FIG. 16 a pixel-level tracker 1606, predictor-corrector filter 1608, and state projection transformation function 1610 execute in the camera processor unit 808 previously described in FIG. 8, where the algorithms for tracking objects in real-time video performed by the a "state-based model-free tracking system" 1600 are chosen from algorithms well known by those of ordinary skill in the art. In the embodiment, detected feature locations 1612 are passed to the predictor-corrector filter 1608, which also receives image space feature location estimates 1614 from the state projection transformation function 1610. The predictor-corrector filter 1608 sends cues for detection of features 1616 in the next frame back to the pixel-level tracker 1606, and then the predictor-corrector filter 1608 sends its corrected image space states 1618 to the Bayesian network 1620. The Bayesian network 1620 executes in the integration processor 1104 previously described in FIG. 11, and the Bayesian network 1620 fuses the independent observations from the multiple cameras using the method described by Dockstader, wherein any other methods for fusing independent observations from the multiple cameras may also be used. Then the Bayesian network 1620 produces the most likely "vector of 3D state estimates" 1622 given the available data. This "vector of 3D state estimates" 1622 is then processed by a Kalman filter 1624 to maintain temporal continuity. The Kalman filter 1624 then produces a "corrected 3D state vector" 1626 which is sent back to the state projection transformation function 1610, thereby closing the loop. This "state-based model-free tracking system" 1600 is sufficient for both the point and bounding box model generation described in previous paragraphs.

An alternate embodiment enhance the method of Dockstader by adding model-based tracking. Model-based tracking would the embodiment to leverage the fact that the embodiment knows a great deal about the structure, kinematics, and behaviors of the objects being tracked, i.e., players, playing a game, with a ball or a puck, to afford better tracking and handling of occlusions, as described in "3-D model based tracking of humans in action: a multi-view approach", *Proceedings CVPR '96*: 1996 *IEEE Computer Society Conference on Computer Vision and Pattern Recognition*, 18-20 Jun. 1996, San Francisco, 1996, by D. M. Gavrila and L. S. Davis, where Gavrila and Davis demonstrated a method for both estimating 3D articulated models and poses for multiple interacting humans from four video streams. However there is no indication that the work of Gavrila and Davis was done in real-time as discussed in "3-D model based tracking of humans in action: a multi-view approach", *Proceedings CVPR '96*: 1996 *IEEE Computer Society Conference on Computer Vision and Pattern Recognition*, 18-20 Jun. 1996, San Francisco, 1996, by D. M. Gavrila and L. S. Davis. The Gavrila and Davis method uses articulated models constructed from parametric volumes, so that the models are easily reconstructed at the entertainment centers 616 previously described in FIG. 6. In addition, in this embodiment the initial models generated from digital scans of the players are supplied ahead of time by a designer.

(5) Advantages of the Embodiments of the Invention

A system for real-time, group interactive, augmented-reality monitoring of an area, suitable for enhancing the enjoyment of entertainment events, was presented. An embodiment of the present invention enables a user to interactively augment in real-time his/her local display of events with user-inputted doodles, user requested information and statistics, and user selected viewing angles. The embodiment of the present invention further allows users to interactively share their locally augmented-reality display with users of other display centers in real-time. In addition the present invention allows the user to switch the display device to display a video game mode where the user continues the entertainment event (sport game) as the user would like to see the entertainment event (sport game) play out, until the user decides to switch back to live action.

Furthermore, the various embodiments of the present invention provide a fan with three experiences not currently available. First, the various embodiments provide the capability to select additional high-quality views of an event, potentially from a display center or a luxury box viewpoint. Second, the various embodiments provide augmentation of the view with graphical and textual information, as previously shown in FIG. 5, unavailable to viewers in the stands or at home. Third, the various embodiments provide an electronic community for the users before, during, and after the game. Luxury box users can chat with and razz their friends via WAP enabled phones on the way to the game, continue the same thread during the game, and finish up on the way home and at home from desktop machines.

Therefore, the previously described embodiments of the present invention have many advantages, including: the ability to select additional high-quality views of an event; the ability to communicate with other users, which may or may not be physically present at the area being monitored, via user-drawn doodles and shared database information related to the current event and prior similar events; the ability to augment the view of the event played in the area being monitored with graphical and textual information, such as prior statistics related to the current event or prior similar events; the ability for the user to switch his/her display device to display a video game mode that allows the user to continue the sport game as the user would like to see the sport game play out, until the user decides to switch back the display device to display live action captured by the video cameras; and providing an electronic community for the users before, during, and after the game. Furthermore, the present invention does not require that all the advantageous features previously presented need to be incorporated into every embodiment of the invention.

Although the present invention has been described in considerable detail with reference to certain embodiments thereof, other embodiments are possible. Therefore, the spirit and scope of the appended claims should not be limited to the description of the embodiments contained herein. Furthermore, the present invention does not require that all the advantageous features previously presented need to be incorporated into every embodiment of the invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" in the claims herein is not intended to invoke the provisions of 35 U.S.C. Section 112, Paragraph 6.

What is claimed is:

1. A real-time, group interactive, augmented-reality area monitoring system, suitable for enhancing the enjoyment of entertainment events, the system comprising:
   a sensor data acquisition system for receiving sensor data, in real-time, from a plurality of data acquisition sensors disposed about an area to be monitored;
   a plurality of display centers communicatively coupled with the sensor data acquisition system for receiving sensor data therefrom, with each display center further comprising:
      an input for receiving input from a user;
      a sensor selector for allowing a user to select at least one data acquisition sensor from which to display sensor data;
      an interaction interface for communicating, in real-time, with other display centers to allow a user of a display center to interact with users of other display centers;
      a local data augmenting system for locally augmenting the display of the sensor data with user input; and an interface for connecting the display center with a display device; and an object recognition system for receiving sensor data from the data acquisition system and for recognizing a segment of the sensor data;

wherein the object recognition system comprises a model-extractor for extracting spatially-registered geometric models of objects present in the sensor data;

a central data augmenting system coupled with the sensor data acquisition system for centrally augmenting sensor data from the data acquisition sensors before the sensor data is received by the display centers;

wherein the object recognition system augments the sensor data with information regarding the recognized segment for provision to the central data augmenting system;

a recognition-information database connected with the object recognition system and with the central data augmenting system so that a user may select an object to be recognized so that the system automatically recognizes the object selected and provides information regarding the object from the recognition information database;

a data-marker for marking the sensor data received from the data acquisition sensors, wherein the data acquisition sensors include at least one of a video camera capturing video frames, an audio recording sensor, and a video/audio camera, wherein the video/audio camera records video signals and audio signals concurrently, wherein the video camera is oriented at a line-of-sight (LOS) orientation viewing angle during a video frame, and where the data-marker marks the sensor data received from a video camera with a time-tag corresponding to a video frame and with the line-of-sight (LOS) orientation angle of the video camera at the video frame; and an interaction-selector for allowing a user of a display center to selectively choose which other display centers to interact with, and wherein a user of a selected to interact with display center may choose to cancel the interaction with a particular display center at any time.

2. A real-time, group interactive, augmented-reality area monitoring system as set forth in claim 1, wherein the object recognition system comprises:

a tracker for tracking the sensor data marked with time-tag and (LOS) orientation angle, wherein the tracker detects object features that represent a recognized object, finds feature locations of the object features in the data acquisition sensors, creates three-dimensional feature location data by fusing the feature locations of the object features from the plurality of data acquisition sensors, and tracks the three dimensional feature location data in the data acquisition sensors over time;

wherein the model-extractor extracts the spatially-registered geometric models from the three-dimensional feature location data, and further extracts texture models from the current video frame based on location of the spatially-registered geometric models in the area being monitored;

a parameter-extractor for extracting time-tagged parameters from the spatially-registered geometric models, wherein the parameter-extractor outputs time-tagged parameters that characterize the objects recognized;

a model-matcher for associating a spatially-registered geometric model with an actor performing an activity;

a time-marker for time-tagging the spatially-registered geometric model of the actor;

an activity-storage for storing a time sequence of activities performed by an actor by using time-tagged spatially-registered geometric models of the actor; and a spatially-registered geometric model database for storing a time sequence of activities performed by an actor and a spatially-registered geometric model generated by the object recognition system, so that a user may select a spatially-registered geometric model for display on the display center, or so that a user may select to recreate prior activities by displaying on the display center a time sequence of activities previously performed by an actor.

3. A real-time, group interactive, augmented-reality area monitoring system as set forth in claim 2, wherein the central data augmenting system comprises:

a visual-renderer for rendering time-tagged visual representation overlays of the spatially-registered geometric models of objects present in the sensor data;

a doodle-renderer for rendering time-tagged graphical doodle overlays inputted by the user, wherein a user draws doodles on an electronic writing device connected to the display center, and the user chooses between an absolute position for the doodles where the absolute position is spatially-registered to the monitored area, or a relative position for the doodles where the relative position is spatially-registered to an object within the monitored area, and wherein the doodle-renderer renders a time-tagged graphical doodle overlay by using the inputted doodles, the absolute position of the doodles or the relative position of the doodles, the spatially-registered geometric models, and the viewing angle selected be by the user; and a compositor for composing a time-tagged visual representation overlay onto the video frames from the data acquisition sensors for display on the display center, wherein the user selects a time-tagged visual representation overlay from the plurality of choices of time-tagged visual representation overlays, and wherein the compositor generates a composited augmented reality audiovisual media stream by combining the selected time-tagged visual representation overlay, the time-tagged video frames, a time-tagged audio signal, and the time-tagged graphical doodle overlay.

4. A real-time, group interactive, augmented-reality area monitoring system as set forth in claim 3, wherein the activity performed in the area includes at least a sport game played by a plurality of players, and wherein the system further comprises a game mode system for allowing the user to switch the display device to display a video game mode, wherein in the video game mode the user continues the sport game as the user would like to see the sport game play out, until the user decides to switch back the display device to display live action captured by the video cameras, and wherein the spatially-registered geometric actor models and information stored in the current-event database reflecting the state of the current sport game are used as initial states for a game engine.

5. A real-time, group interactive, augmented-reality area monitoring system, suitable for enhancing the enjoyment of entertainment events, the system comprising:

a sensor data acquisition system for receiving sensor data, in real-time, from a plurality of data acquisition sensors disposed about an area to be monitored;

a display center communicatively coupled with the data acquisition system for receiving sensor data therefrom, with the display center further comprising:

an input for receiving input from a user;

a sensor selector for allowing a user to select at least one data acquisition sensor from which to display sensor data;
a connecting interface for communicating, in real-time, with a communication network, wherein the communication network allows the user of the display center to interact with other users connected to the communication network;
a local augmenting system for locally augmenting the display of the sensor data with user input; and
an interface for connecting the display center with a display device; and
an object recognition system for receiving sensor data from the data acquisition system and for recognizing a segment of the sensor data;
wherein the object recognition system comprises a model-extractor for extracting spatially-registered geometric models of objects present in the sensor data;
a central data augmenting system coupled with the sensor data acquisition system for centrally augmenting sensor data from the data acquisition sensors before the sensor data is received by the display center;
wherein the object recognition system augments the sensor data with information regarding the recognized segment for provision to the central data augmenting system;
a recognition-information database connected with the object recognition system and with the central data augmenting system so that a user may select an object to be recognized so that the system automatically recognizes the object selected and provides information regarding the object from the recognition information database; and
a data-marker for marking the sensor data received from the data acquisition sensors, wherein the data acquisition sensors include at least one of a video camera capturing video frames, an audio recording sensor, and a video/audio camera, wherein the video/audio camera records video signals and audio signals concurrently, wherein the video camera is oriented at a line-of-sight (LOS) orientation viewing angle during a video frame, and where the data-marker marks the sensor data received from a video camera with a time-tag corresponding to a video frame and with the line-of-sight (LOS) orientation angle of the video camera at the video frame.

6. A real-time, group interactive, augmented-reality area monitoring system, suitable for enhancing the enjoyment of entertainment events, the system comprising:
a sensor data acquisition system for receiving sensor data, in real-time, from a plurality of data acquisition sensors disposed about an area to be monitored;
a display center communicatively coupled with the data acquisition system for receiving sensor data therefrom, with the display center further comprising:
an input for receiving input from a user;
a sensor selector for allowing a user to select at least one data acquisition sensor from which to display sensor data;
a connecting interface for communicating, in real-time, with a communication network, wherein the communication network allows the user of the display center to interact with other users connected to the communication network;
a local augmenting system for locally augmenting the display of the sensor data with user input; and
an interface for connecting the display center with a display device; and
an object recognition system for receiving sensor data from the data acquisition system and for recognizing a segment of the sensor data;
wherein the object recognition system comprises a model-extractor for extracting spatially-registered geometric models of objects present in the sensor data;
a central data augmenting system coupled with the sensor data acquisition system for centrally augmenting sensor data from the data acquisition sensors before the sensor data is received by the display centers;
wherein the object recognition system comprises:
a tracker for tracking the sensor data marked with time-tag and (LOS) orientation angle, wherein the tracker detects object features that represent a recognized object, finds feature locations of the object features in the data acquisition sensors, creates three-dimensional feature location data by fusing the feature locations of the object features from the plurality of data acquisition sensors, and tracks the three dimensional feature location data in the data acquisition sensors over time;
wherein the model-extractor extracts the spatially-registered geometric models from the three-dimensional feature location data, and further extracts texture models from the current video frame based on location of the spatially-registered geometric models in the area being monitored;
a parameter-extractor for extracting time-tagged parameters from the spatially-registered geometric models, wherein the parameter-extractor outputs time-tagged parameters that characterize the objects recognized;
a model-matcher for associating a spatially-registered geometric model with an actor performing an activity;
a time-marker for time-tagging the spatially-registered geometric model of the actor;
an activity-storage for storing a time sequence of activities performed by an actor by using time-tagged spatially-registered geometric models of the actor; and
a spatially-registered geometric model database for storing a time sequence of activities performed by an actor and a spatially-registered geometric model generated by the object recognition system, so that a user may select a spatially-registered geometric model for display on the display center, or so that a user may select to recreate prior activities by displaying on the display center a time sequence of activities previously performed by an actor.

7. A real-time, group interactive, augmented-reality area monitoring system, suitable for enhancing the enjoyment of entertainment events, the system comprising:
a sensor data acquisition system for receiving sensor data, in real-time, from a plurality of data acquisition sensors disposed about an area to be monitored;
a display center communicatively coupled with the data acquisition system for receiving sensor data therefrom, with the display center further comprising:
an input for receiving input from a user;
a sensor selector for allowing a user to select at least one data acquisition sensor from which to display sensor data;
a connecting interface for communicating, in real-time, with a communication network, wherein the communication network allows the user of the display center to interact with other users connected to the communication network;
a local augmenting system for locally augmenting the display of the sensor data with user input; and
an interface for connecting the display center with a display device; and an object recognition system for receiving sensor data from the data acquisition system and for recognizing a segment of the sensor data;

wherein the object recognition system comprises a model-extractor for extracting spatially-registered geometric models of objects present in the sensor data;

wherein the object recognition system augments the sensor data with information regarding the recognized segment for provision to the local data augmenting system;

wherein the central data augmenting system comprises:

a visual-renderer for rendering time-tagged visual representation overlays of the spatially-registered geometric models of objects present in the sensor data;

a doodle-renderer for rendering time-tagged graphical doodle overlays inputted by the user, wherein a user draws doodles on an electronic writing device connected to the display center, and the user chooses between an absolute position for the doodles where the absolute position is spatially-registered to the monitored area, or a relative position for the doodles where the relative position is spatially-registered to an object within the monitored area, and wherein the doodle-renderer renders a time-tagged graphical doodle overlay by using the inputted doodles, the absolute position of the doodles or the relative position of the doodles, the spatially-registered geometric models, and the viewing angle selected be the user; and a compositor for composing a time-tagged visual representation overlay onto the video frames from the data acquisition sensors for display on the display center, wherein the user selects a time-tagged visual representation overlay from the plurality of choices of time-tagged visual representation overlays, and wherein the compositor generates a composited augmented reality audiovisual media stream by combining the selected time-tagged visual representation overlay, the time-tagged video frames, a time-tagged audio signal, and the time-tagged graphical doodle overlay.

8. A method for real-time, group interactive, augmented-reality area monitoring, suitable for enhancing the enjoyment of entertainment events, the method comprising acts of:

receiving sensor data from a sensor data acquisition system, in real-time, where the sensor data acquisition system includes a plurality of data acquisition sensors disposed about an area to be monitored;

receiving sensor data at a plurality of display centers from the plurality of data acquisition sensors, with the act of receiving sensor data further comprising acts of:

receiving input from a user;

selecting, based on the user input, at least one data acquisition sensor from a sensor selector from which to display sensor data;

communicating, in real-time, with other display centers using an interaction interface to allow a user of a display center to interact with users of other display centers;

locally augmenting the display of the sensor data using a local data augmenting system with user input; and transmitting the augmented sensor data for display on a display center with a display device; and receiving sensor data from the data acquisition system using an object recognition system and recognizing a segment of the sensor data;

wherein the object recognition system extracts spatially-registered geometric models of objects present in the sensor data with a model-extractor;

centrally augmenting sensor data from the data acquisition sensors using a central data augmenting system coupled with the sensor data acquisition system before the sensor data is received by the display centers;

augmenting the sensor data with information regarding the recognized segment for provision to the central data augmenting system;

communicating with a recognition-information database with the object recognition system and with the central data augmenting system so that a user may select an object to be recognized so that the system automatically recognizes the object selected and provides information regarding the object from the recognition information database;

marking the sensor data received from the data acquisition sensors with a data-marker, wherein the data acquisition sensors include at least one of a video camera capturing video frames, an audio recording sensor, and a video/audio camera, wherein the video/audio camera records video signals and audio signals concurrently, wherein the video camera is oriented at a line-of-sight (LOS) orientation viewing angle during a video frame, and where the data-marker marks the sensor data received from a video camera with a "time-tag" corresponding to a video frame and with the line-of-sight (LOS) orientation angle of the video camera at the video frame; and selecting, by user input, which other display centers the display center of a user will interact with by using an interaction-selector, and wherein a user of the selected display center can choose to cancel the interaction with a particular display center at any time.

9. The method for real-time, group interactive, augmented-reality area monitoring as set forth in claim 8, the object recognition system further comprising acts of:

tracking the sensor data marked with time-tag and (LOS) orientation angle with a tracker, wherein the tracker detects object features that represent a recognized object, finds feature locations of the object features in the data acquisition sensors, creates three-dimensional feature location data by fusing the feature locations of the object features from the plurality of data acquisition sensors, and tracks the three-dimensional feature location data in the data acquisition sensors over time;

extracting the spatially-registered geometric models from the three-dimensional feature location data with the model-extractor, wherein the model-extractor further extracts texture models from the current video frame based on location of the spatially-registered geometric models in the area being monitored;

extracting time-tagged parameters from the spatially-registered geometric models with a parameter-extractor, wherein the parameter-extractor outputs time-tagged parameters that characterize the objects recognized;

associating a spatially-registered geometric model with an actor performing an activity using a model-matcher;

time-tagging the spatially-registered geometric model of the actor with a time-marker;

storing a time sequence of activities performed by an actor with an activity-storage by using time-tagged spatially-registered geometric models of the actor; and storing a time sequence of activities performed by an actor with a spatially-registered geometric model database and a spatially-registered geometric model generated by the object recognition system, so that a user may select a spatially-registered geometric model for display on the display center, or so that a user may select to recreate prior activities by displaying on the display center a time sequence of activities previously performed by an actor.

10. The method for real-time, group interactive, augmented-reality area monitoring as set forth in claim 9, the central data augmenting system further comprising acts of:
rendering time-tagged visual representation overlays of the spatially-registered geometric models of objects present in the sensor data with a visual-renderer;
rendering time-tagged graphical doodle overlays inputted by the user with a doodle-renderer, wherein a user draws doodles on an electronic writing device connected to the display center, and the user chooses between an absolute position for the doodles where the absolute position is spatially-registered to the monitored area, or a relative position for the doodles where the relative position is spatially-registered to an object within the monitored area, and wherein the doodle-renderer renders a time-tagged graphical doodle overlay by using the inputted doodles, the absolute position of the doodles or the relative position of the doodles, the spatially-registered geometric models, and the viewing angle selected be the user; and
composing a time-tagged visual representation overlay onto the video frames from the data acquisition sensors for display on the display center using a compositor, wherein the user selects a time-tagged visual representation overlay from the plurality of choices of time-tagged visual representation overlays, and wherein the compositor generates a composited augmented reality audiovisual media stream by combining the selected time-tagged visual representation overlay, the time-tagged video frames, the time-tagged audio signal, and the time-tagged graphical doodle overlay.

11. The method for real-time, group interactive, augmented-reality area monitoring as set forth in claim 10, further comprising an act of switching, based on user input, the display device to display a video game mode, wherein in the video game mode the user continues a sport game as the user would like to see the sport game play out, until the user decides to switch back the display device to display a live action captured by the video cameras.

12. A method for real-time, group interactive, augmented-reality area monitoring, suitable for enhancing the enjoyment of entertainment events, the method comprising acts of:
receiving sensor data from a sensor data acquisition system, in real-time, where the sensor data acquisition system includes a plurality of data acquisition sensors disposed about an area to be monitored; and
receiving sensor data at a plurality of display centers from the data acquisition centers, with the act of receiving sensor data further comprising acts of:
receiving input from a user;
selecting, based on the user input, at least one data acquisition sensor from a sensor selector from which to display sensor data;
communicating, in real-time, with other display centers using an interaction interface to allow a user of a display center to interact with users of other display centers;
locally augmenting the display of the sensor data using a local data augmenting system with user input; and
transmitting the augmented sensor data for display on a display center with a display device;
centrally augmenting sensor data from the data acquisition sensors using a 5central data augmenting
receiving sensor data from the data acquisition system using an object recognition system and recognizing a segment of the sensor data and for augmenting the sensor data with information regarding the recognized segment for provision to the central data augmenting system;
communicating with a current-event database with the display center and with the central data augmenting system, whereby users in the display centers can access information of interest related to current events in the area being monitored;
communicating with a related-information database with the display center and with the central data augmenting system, whereby a user in the display center can access information of interest related to prior events, wherein the prior events are related to current events in the area being monitored;
communicating with a recognition-information database with the object recognition system and with the central data augmenting system so that a user may select an object to be recognized so that the system automatically recognizes the object selected and provides information regarding the object from the recognition information database;
marking the sensor data received from the data acquisition sensors with a data-marker, wherein the data acquisition sensors include at least one of a video camera capturing video frames, an audio recording sensor, and a video/audio camera, wherein the video/audio camera records video signals and audio signals concurrently, wherein the video camera is oriented at a line-of-sight (LOS) orientation viewing angle during a video frame, and where the data-marker marks the sensor data received from a video camera with a time-tag corresponding to a video frame and with the line-of-sight (LOS) orientation angle of the video camera at the video frame;
marking an audio signal with a time-tag using an audio-marker, the time-tag corresponding to a video frame synchronized with the audio signal;
adjusting the viewing angle of an angle-controller, wherein the video cameras are digital cameras configured to allow for viewing angle adjustment, and wherein the angle-controller provides for adjusting the viewing angle of the video cameras; and
selecting, by user input, which other display centers the display center of a user will interact with by using an interaction-selector, and wherein a user of the selected display center can choose to cancel the interaction with a particular display center at any time.

13. A method for real-time, group interactive, augmented-reality area monitoring, suitable for enhancing the enjoyment of entertainment events, the method comprising acts of:
receiving sensor data from a sensor data acquisition system, in real-time, where the sensor data acquisition system includes a plurality of data acquisition sensors disposed about an area to be monitored; and
receiving sensor data at a plurality of display centers from the data acquisition centers, with the act of receiving sensor data further comprising acts of:
receiving input from a user;
selecting, based on the user input, at least one data acquisition sensor from a sensor selector from which to display sensor data;
communicating, in real-time, with other display centers using an interaction interface to allow a user of a display center to interact with users of other display centers;
locally augmenting the display of the sensor data using a local data augmenting system with user input; and transmitting the augmented sensor data for display on a display center with a display device;

further comprising an act of centrally augmenting sensor data from the data acquisition sensors before the sensor data is received by the display centers using a central data augmenting system coupled with the sensor data acquisition system;

tracking the sensor data marked with time-tag and (LOS) orientation angle with a tracker, wherein the tracker detects object features that represent a recognized object, finds feature locations of the object features in the data acquisition sensors, creates three-dimensional feature location data by fusing the feature locations of the object features from the plurality of data acquisition sensors, and tracks the three-dimensional feature location data in the data acquisition sensors over time;

extracting spatially-registered geometric models of objects present in the sensor data with a model-extractor, wherein the model-extractor extracts the spatially-registered geometric models from the three-dimensional feature location data, and further extracts texture models from the current video frame based on location of the spatially-registered geometric models in the area being monitored;

extracting time-tagged parameters from the spatially-registered geometric models with a parameter-extractor, wherein the parameter-extractor outputs time-tagged parameters that characterize the objects recognized;

associating a spatially-registered geometric model with an actor performing an activity using a model-matcher;

time-tagging the spatially-registered geometric model of the actor with a time-marker;

storing a time sequence of activities performed by an actor with an activity-storage by using time-tagged spatially-registered geometric models of the actor; and storing a time sequence of activities performed by an actor with a spatially-registered geometric model database and a spatially-registered geometric model generated by the object recognition system, so that a user may select a spatially-registered geometric model for display on the display center, or so that a user may select to recreate prior activities by displaying on the display center a time sequence of activities previously performed by an actor.

14. A method for real-time, group interactive, augmented-reality area monitoring, suitable for enhancing the enjoyment of entertainment events, the method comprising acts of:

receiving sensor data from a sensor data acquisition system, in real-time, where the sensor data acquisition system includes a plurality of data acquisition sensors disposed about an area to be monitored; and receiving sensor data at a plurality of display centers from the data acquisition centers, with the act of receiving sensor data further comprising acts of:

receiving input from a user;

selecting, based on the user input, at least one data acquisition sensor from a sensor selector from which to display sensor data;

communicating, in real-time, with other display centers using an interaction interface to allow a user of a display center to interact with users of other display centers;

locally augmenting the display of the sensor data using a local data augmenting system with user input; and transmitting the augmented sensor data for display on a display center with a display device;

receiving sensor data from the data acquisition system;

recognizing a segment of the sensor data; and augmenting the sensor data with information regarding the recognized segment for provision to the local data augmenting system using an object recognition system, rendering time-tagged visual representation overlays of the spatially-registered geometric models of objects present in the sensor data with a visual-renderer, wherein the visual-renderer renders a time-tagged visual representation overlay by combining information provided by the current-event database and the related-information database with the spatially-registered geometric models and the viewing angle selected be the user, and wherein the visual-renderer provides the user with a plurality of choices of time-tagged visual representation overlays for each input query requested by the user;

rendering time-tagged graphical doodle overlays inputted by the user with a doodle-renderer, wherein a user draws doodles on an electronic writing device connected to the display center, and the user chooses between an absolute position for the doodles where the absolute position is spatially-registered to the monitored area or a relative position for the doodles where the relative position is spatially-registered to an object within the monitored area, and wherein the doodle-renderer renders a time-tagged graphical doodle overlay by using the inputted doodles, the absolute position of the doodles or the relative position of the doodles, the spatially-registered geometric models, and the viewing angle selected be the user; and composing a time-tagged visual representation overlay onto the video frames from the data acquisition sensors for display on the display center using a compositor, wherein the user selects a time-tagged visual representation overlay from the plurality of choices of time-tagged visual representation overlays, and wherein the compositor generates a composited augmented reality audiovisual media stream by combining the selected time-tagged visual representation overlay, the time-tagged video frames, the time-tagged audio signal, and the time-tagged graphical doodle overlay.

* * * * *